US012631770B2

(12) United States Patent
Revol

(10) Patent No.: US 12,631,770 B2
(45) Date of Patent: May 19, 2026

(54) MAC METHOD FOR MONITORING, WITH COMMON BIAS COMPENSATION, THE INTEGRITY OF A POINT POSITIONING PROCESS USING VIRTUAL BEACONS

(71) Applicant: GTS FRANCE SAS, Velizy-Villacoublay (FR)

(72) Inventor: Marc Revol, Upie (FR)

(73) Assignee: GTS FRANCE SAS, Velizy-Villacoublay (FR)

( * ) Notice: Subject to any disclaimer, the term of this patent is extended or adjusted under 35 U.S.C. 154(b) by 357 days.

(21) Appl. No.: 18/220,688

(22) Filed: Jul. 11, 2023

(65) Prior Publication Data

US 2024/0027631 A1     Jan. 25, 2024

(30) Foreign Application Priority Data

Jul. 12, 2022     (FR) ...................................... 2207132
Sep. 6, 2022     (FR) ...................................... 2208888

(51) Int. Cl.
*G01S 19/50*          (2010.01)
*B61L 25/02*          (2006.01)
(Continued)

(52) U.S. Cl.
CPC ............ *G01S 19/50* (2013.01); *B61L 25/025* (2013.01); *G01S 19/256* (2013.01); *G01S 19/40* (2013.01); *B61L 2205/04* (2013.01)

(58) Field of Classification Search
CPC ........ G01S 19/50; G01S 19/256; G01S 19/40; B61L 25/025; B61L 2205/04
See application file for complete search history.

(56) References Cited

U.S. PATENT DOCUMENTS 9,166,649 B2     10/2015  Revol et al.
2011/0181463 A1*  7/2011  Chopard ................. G01S 19/24
                                                    342/357.68
(Continued)

FOREIGN PATENT DOCUMENTS

CN          103221291 A  *  7/2013  ............ B61L 25/026
CN          103760571 A     4/2014
(Continued)

OTHER PUBLICATIONS

Parro-Jimenez, et al., "Signal-Level Integrity Monitoring Metric for Robust GNSS receivers", American Institute of Aeronautics and Astronautics, 2013.

*Primary Examiner* — William Kelleher
*Assistant Examiner* — Noah Yi Min Zhu
(74) *Attorney, Agent, or Firm* — BakerHostetler

(57) ABSTRACT

A method for checking the integrity of the point positioning process obtained by determining the closest position, based on the adapted filtering of received GNSS signals, of a set of georeferenced reference positions for implementation on a mobile or fixed carrier, the method making it possible to check that the correlation function of the received GNSS signals is consistent with the selected reference position. The method for checking the integrity of the nearest location comprises: a first step for pre-selecting satellite signals suitable for the position integrity test, based on the minimum signal-to-noise ratio of the point correlation channel, a second step to exclude satellite signals that are not compatible with the predicted code phases, based on the absence of a Maximum At Center (MAC) of the early-punctual-late correlation points and meeting the non-integrity, non-continuity and alarm delay risks required for positioning system security, at least one maximum likelihood search step on the
(Continued)

E1: Synchronize the local time base — 101

E2: Calculate the predicted code phases — 102

E3: Calculate the in-band signal-to-noise ratio — 103

E4: Determine the protection radius for the required non-integrity and non-continuity risks — 104

E5: Calculate the effective level of the punctual channel after matched filtering compensated by the common bias — 105

E6: Calculate the effective level of the advance and delay channels after matched filtering compensated for the common bias — 106

E7: Preliminary selection of the satellites based on minimum signal-to-noise ratio — 107

E8: Exclude the satellites by MAC — 108

E9: Calculate the likelihood of the positions by multi-satellite correlation — 109

E10: Determine the closest reference position by likelihood maximization — 110 set of reference positions obtained by cumulating the elementary powers of the various selected satellites.

7 Claims, 10 Drawing Sheets

(51)  Int. Cl.
    *G01S 19/25*        (2010.01)
    *G01S 19/40*        (2010.01)

(56)           References Cited

U.S. PATENT DOCUMENTS

| | | | | |
|---|---|---|---|---|
| 2011/0285586 | A1* | 11/2011 | Ferguson | G01S 19/04 |
| | | | | 342/357.45 |
| 2013/0030775 | A1* | 1/2013 | Clemenceau | G01S 19/47 |
| | | | | 703/2 |
| 2015/0117500 | A1* | 4/2015 | Revol | G01S 19/21 |
| | | | | 375/150 |
| 2015/0369924 | A1* | 12/2015 | Hedgecock | G01S 19/51 |
| | | | | 342/357.34 |
| 2016/0084962 | A1* | 3/2016 | Vercier | G01S 19/49 |
| | | | | 342/357.58 |
| 2018/0100934 | A1* | 4/2018 | Revol | H04W 64/006 |
| 2018/0259649 | A1* | 9/2018 | Revol | G01S 19/40 |
| 2019/0204450 | A1* | 7/2019 | Revol | G01S 19/252 |
| 2021/0278220 | A1* | 9/2021 | Ries | G01C 21/20 |
| 2022/0135096 | A1* | 5/2022 | Revol | G01S 19/40 |
| | | | | 701/19 |
| 2023/0180171 | A1* | 6/2023 | Modarres Razavi | H04W 64/00 |
| | | | | 455/456.1 |

FOREIGN PATENT DOCUMENTS

| | | | |
|---|---|---|---|
| EP | 3 306 272 | A1 | 4/2018 |
| EP | 3 751 315 | A1 | 12/2020 |
| WO | 2021/198983 | A1 | 10/2021 |

* cited by examiner

[Fig.1]

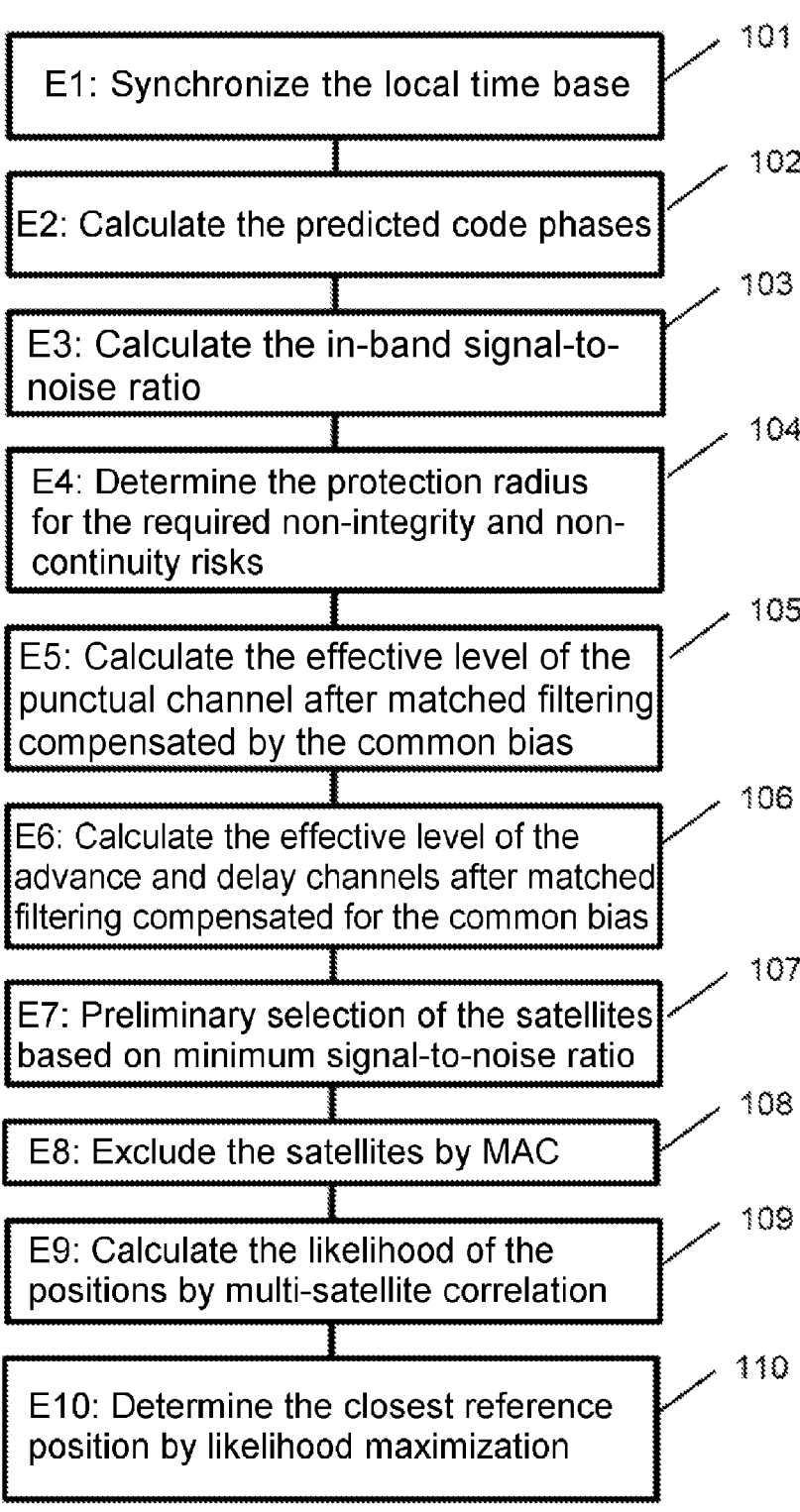

E1: Synchronize the local time base — 101

E2: Calculate the predicted code phases — 102

E3: Calculate the in-band signal-to-noise ratio — 103

E4: Determine the protection radius for the required non-integrity and non-continuity risks — 104

E5: Calculate the effective level of the punctual channel after matched filtering compensated by the common bias — 105

E6: Calculate the effective level of the advance and delay channels after matched filtering compensated for the common bias — 106

E7: Preliminary selection of the satellites based on minimum signal-to-noise ratio — 107

E8: Exclude the satellites by MAC — 108

E9: Calculate the likelihood of the positions by multi-satellite correlation — 109

E10: Determine the closest reference position by likelihood maximization — 110

[Fig.2]
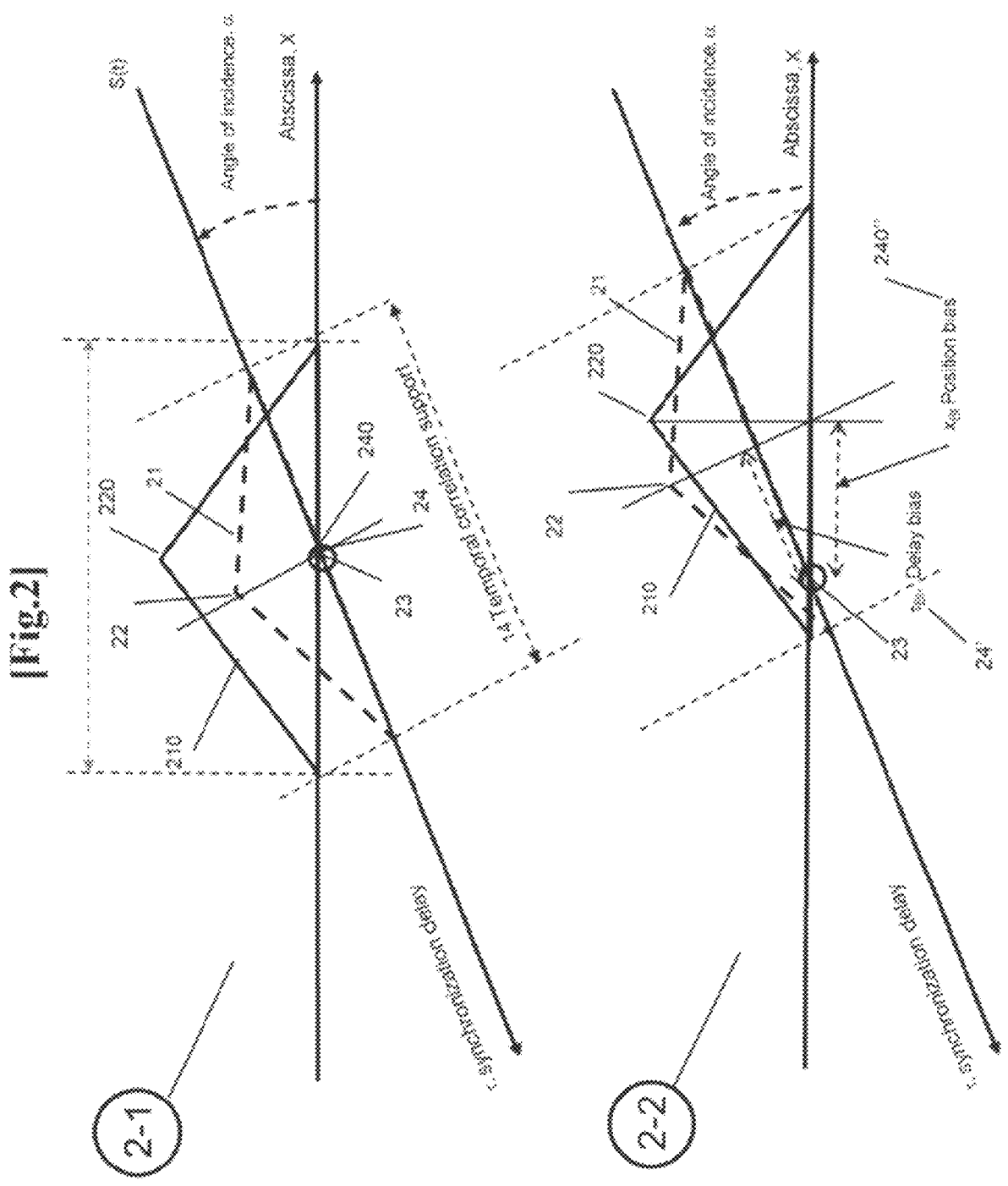

[Fig.3]
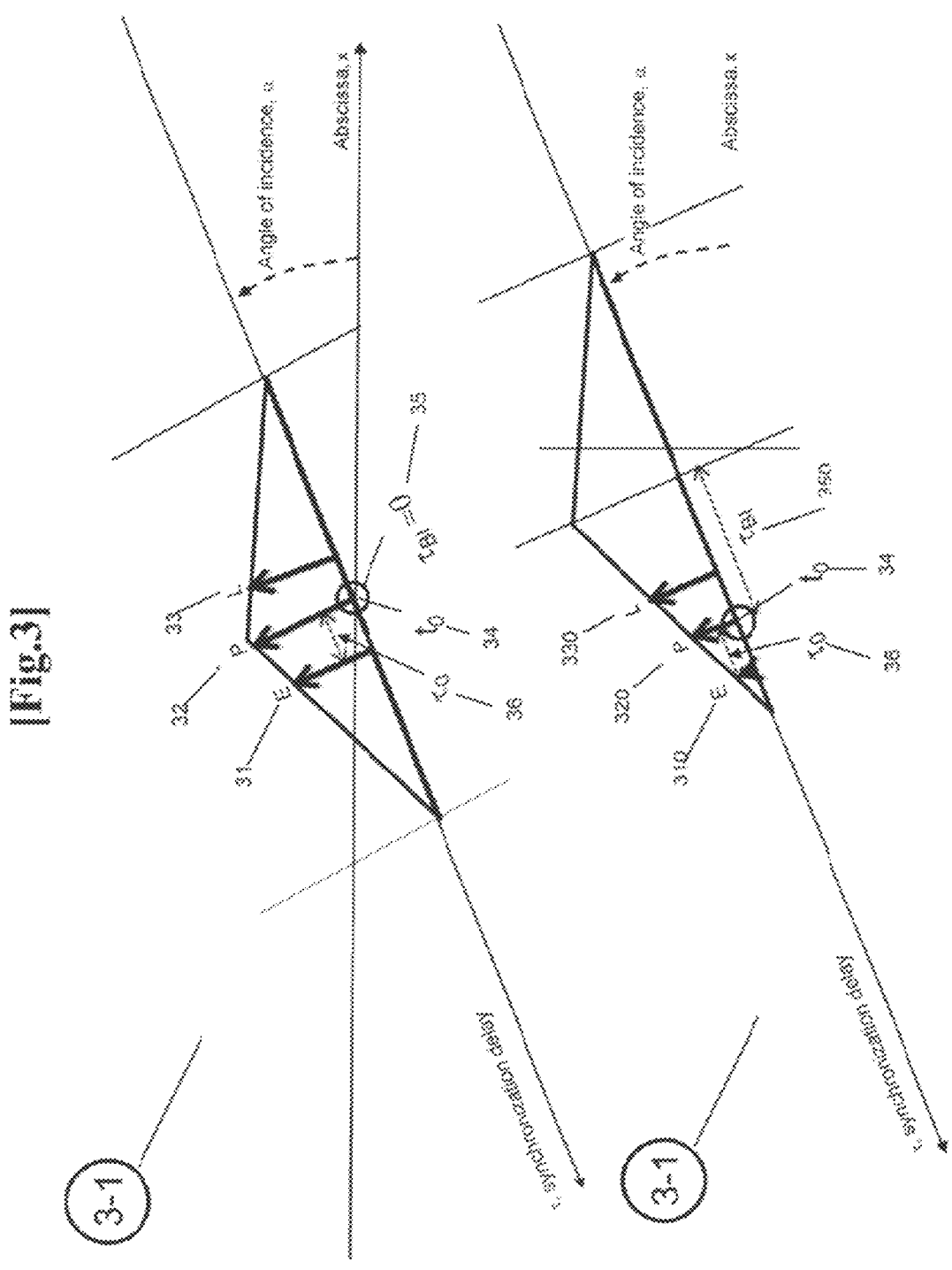

[Fig.4]
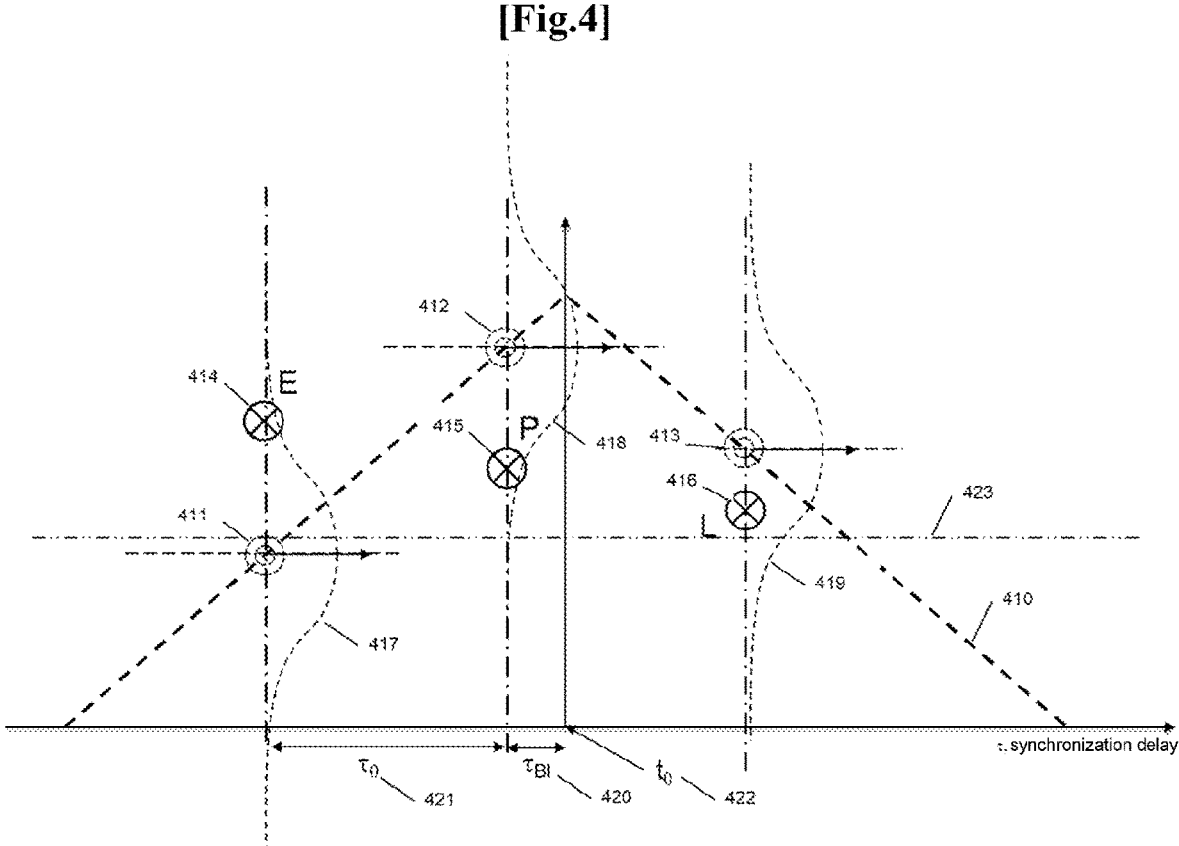

[Fig.5]
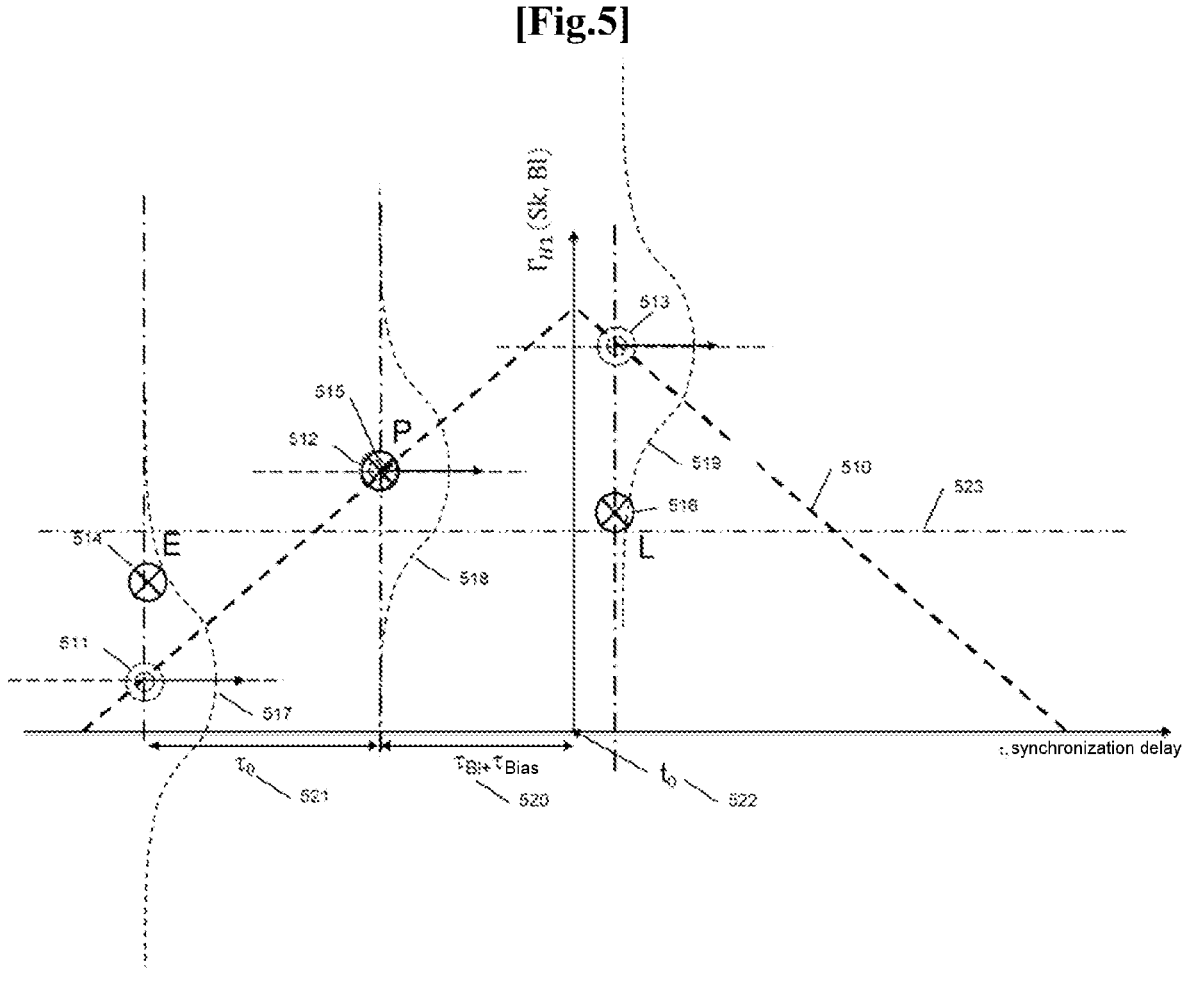

[Fig.6]

[Fig.7]
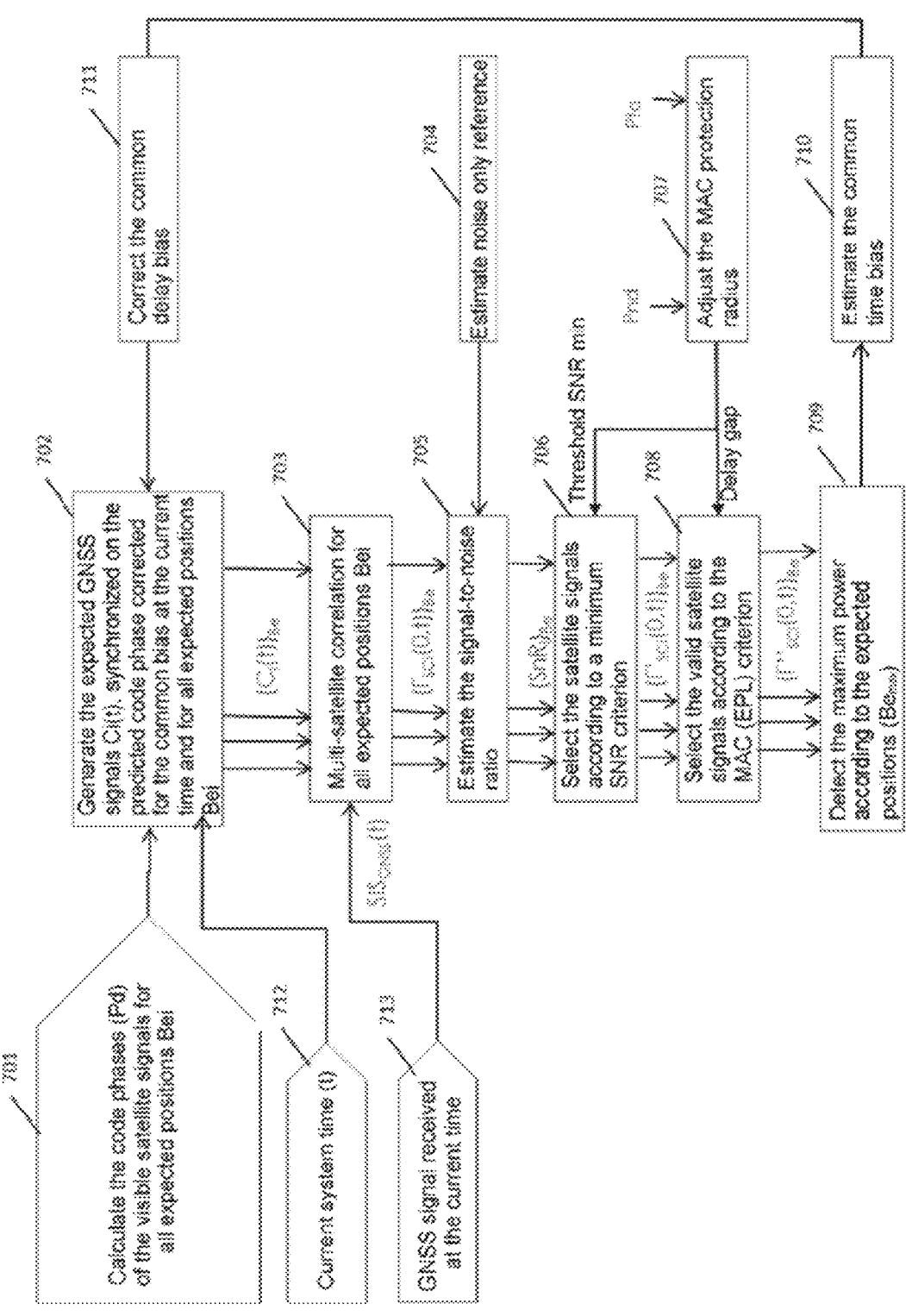

[Fig.8]
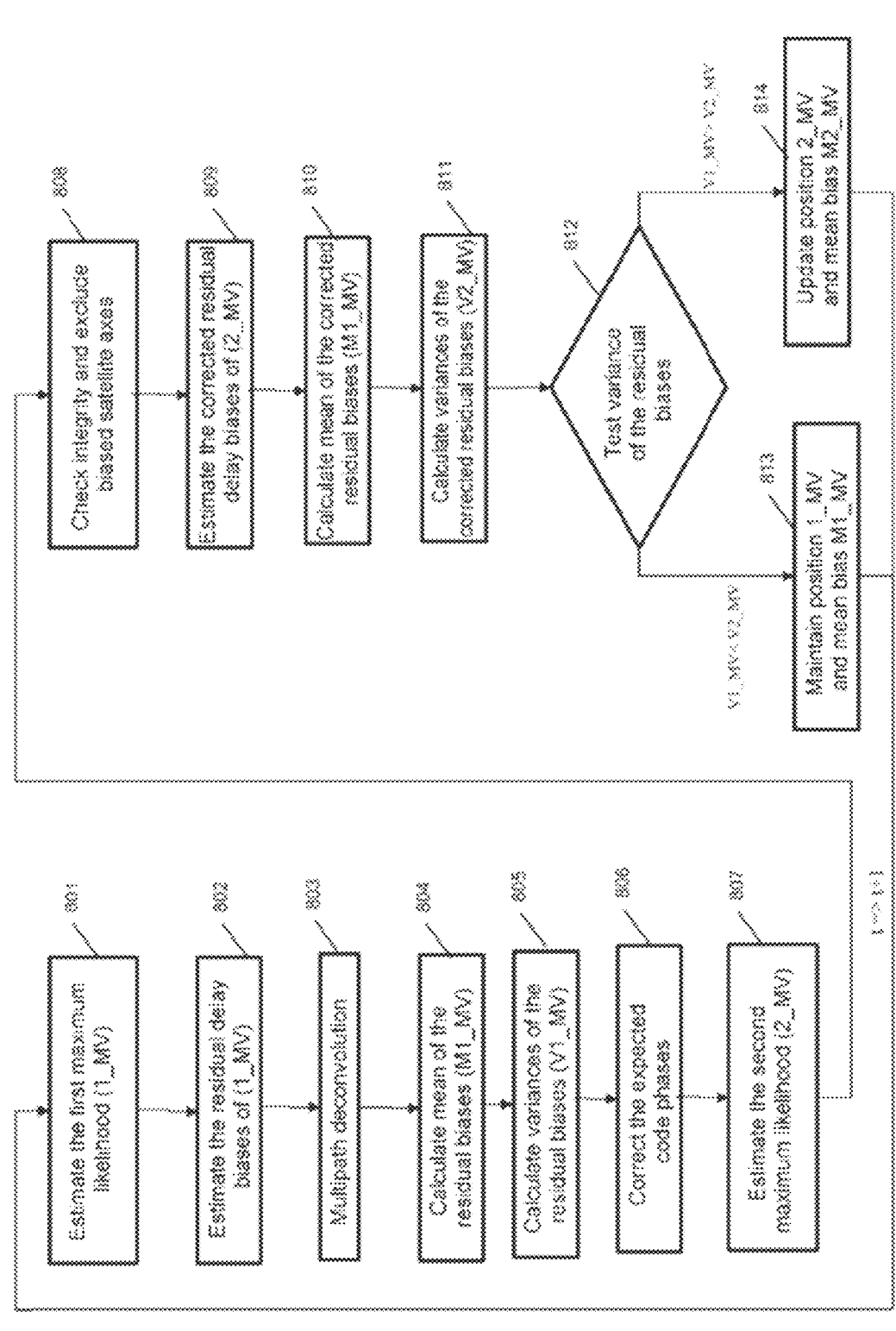

[Fig.9]

[Fig.10]
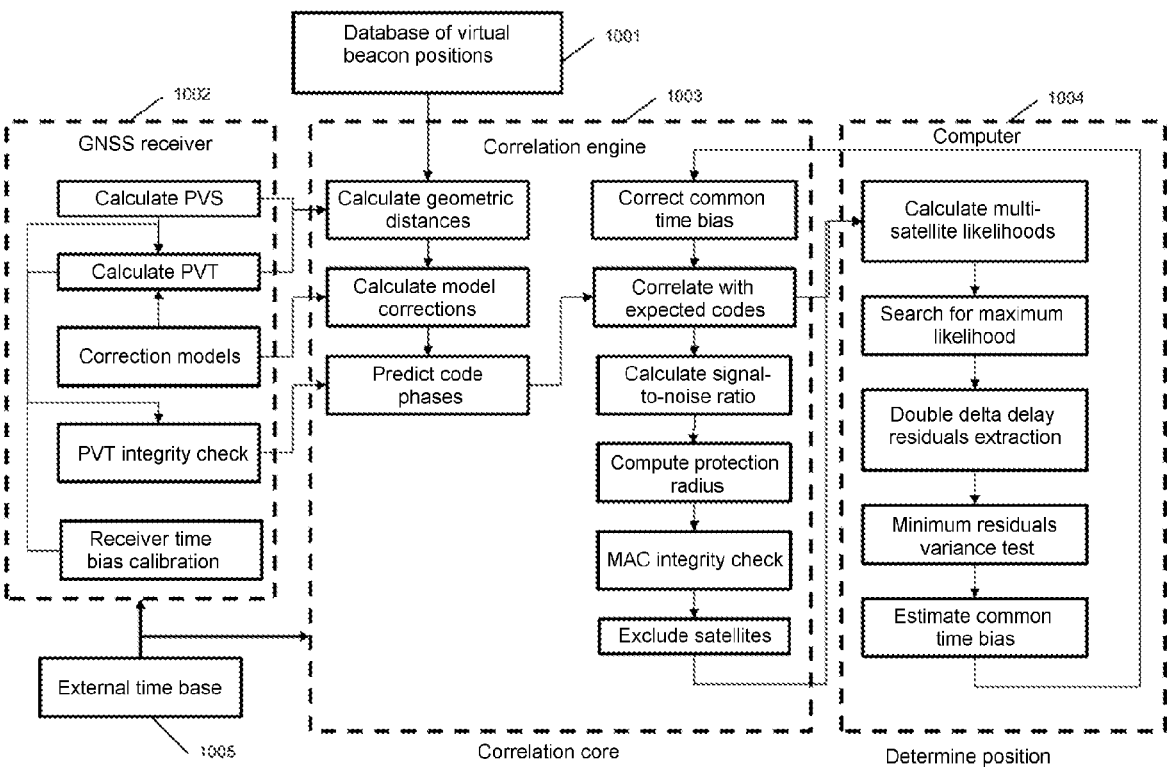

MAC METHOD FOR MONITORING, WITH COMMON BIAS COMPENSATION, THE INTEGRITY OF A POINT POSITIONING PROCESS USING VIRTUAL BEACONS

CROSS-REFERENCE TO RELATED APPLICATIONS

This application claims priority to foreign French patent application No. FR 2207132, filed on Jul. 12, 2022, and claims priority to foreign French patent application No. FR 2208888, filed on Sep. 6, 2022, the disclosures of which are incorporated by reference in their entireties.

FIELD OF THE INVENTION

The invention describes a method for checking the integrity associated with the method of localization by determining the position as close as possible to a set of predefined reference positions, known as position determination on the lookout, for implementation on a mobile or fixed carrier, the said method making it possible to check that the correlation function of the GNSS signals received is consistent with the reference position selected, in accordance with a protection radius and a risk of loss of integrity required for the safety of the positioning system.

BACKGROUND

The effectiveness of this position integrity check is determined by its protection radius, which represents its ability to detect faults likely to cause position errors at least equal to this radius, for the risks of non-detection and false alarm, and the required alarm delays.

The advantage of testing the fit of a hypothetical position with the correlation function of the signals received is that it enables everyone to check whether or not it is in the vicinity of a maximum of the spatial correlation function.

This proposed integrity control test, known as the "Maximum At Center" test (referred to by the acronym MAC in this invention), applies more particularly, but not exclusively, in the context of a point positioning method, as described in patent EP3306272A1 [D1] ("Method for point location of a vehicle moving along a constrained trajectory and associated system"), since the integrity check implements the same physical quantities (match filter output power for known reference positions) as those used by the GNSS receiver's positioning algorithm in relation to a set of geolocated reference points.

This positioning method also greatly simplifies the computational burden of searching for the best positioning hypothesis, as the number of residual candidate beacon positions far from the actual position becomes very small and the selected satellites more discriminating.

The search area of the maximum helps to define the protection radius, and also directly influences the availability of the method (the smaller the radius, the fewer the satellites selected), the number of false alarms generated, and the confidence associated with the detection of faults on the received signals.

The application of this integrity check is not, however, limited to the implementation of the "position determination on the lookout" type of point positioning method, but can also be used to check, via GNSS signals, the confidence of position information delivered by any other means.

The invention also describes the algorithm establishing the relationship between the protection radius thus defined and the risks of loss of continuity and loss of integrity incurred by the integrity control method, implemented for calculating the monitoring protection radius.

The field of application of the invention relates mainly, but not exclusively, to train positioning systems in the railway context, and in particular the definition of virtual beacons operating on the basis of GNSS localization, with a view to emulating a function and interfaces equivalent to Eurobalises, as recommended by current standards.

The invention also applies in the same way to the localization of any mobile platform moving along a constrained trajectory, whether physical or virtual, as is the case in the maritime or fluvial domain for boats moving along navigation channels or canals, in the automotive domain at toll booths or, more generally, for vehicles moving along a geo-referenced lane, in the aeronautical domain for drones having to move along regulated corridors, or even for assistance to people having to move in a confined space.

The "on the lookout" locating method originated in the search for alternative positioning solutions, making it possible to replace train passage detection, based on fixed RFID beacons placed on the ground and representing a significant cost in terms of installation and infrastructure maintenance, with an on-board locating system, providing autonomous on-board positioning, with no need for other lateral infrastructures.

GNSS positioning systems offer an autonomous, "anywhere, anytime" on-board localization capability, as an alternative to the use of physical ground beacons.

The virtual reference beacon solutions envisaged involve the use of a permanent, continuous locating system on board the train, which triggers a position signal equivalent to that of a Eurobalise, when the position provided by the locating system passes as close as possible to the position of the fictitious beacon.

However, the autonomous use of GNSS signals using a standard approach has known limitations:

The availability of GNSS signals may not be sufficient for mobiles operating on the ground, for reasons of signal masking or satellite failure.

Measurement quality may be degraded by propagation disturbances or local interference in the receiving environment.

The accuracy and integrity of location measurements can be significantly lower than those achieved by a robust physical beacon and does not meet the safety objectives expected for rail traffic, as defined by the SIL (Safety Integrity Level) applicable to rail applications.

Since the typical protection radius of a GNSS positioning system varies between 10 m and 60 m depending on the DGPS or SBAS augmentations considered (or not), it is difficult to meet the objectives of guaranteeing the integrity of the calculated position, which is recommended to be less than 5 m, with a standard localization algorithm (PVT).

The present invention is part of an approach to localization by position detection on the lookout, which improves the robustness and availability of localization based on GNSS signals, for which the adapted filtering is carried out by correlating the expected signals according to the spatial domain corresponding to the mobile's displacement, rather than by exploring delays in the time domain.

This Generalized Spatial Correlation technique, also known as "detection on the lookout", reduces the range of uncertainty in the search for the right signal, and can take advantage of the carrier's movement to manage the relative shift of the expected local code and the received signal. The code phase of the local signal is adjusted, at the current date, for the expected reference position of the mobile's passage, while the phase of the received signal evolves naturally with the mobile's displacement according to a position linked to the trajectory.

The Generalized Spatial Correlation positioning technique used in patents [D1] (FR 160 14 49, "Method and system for locating a vehicle on a constrained trajectory") and [D2] (EP3751315, "Method and system for locating a stationary vehicle on a siding using virtual beacons") is referred to in this brief as "GSC".

The present invention thus complements the inventions [D1] and [D2] by associating with them a device for monitoring the integrity of the location solutions provided, to detect any anomalies, positioning errors or failures in the signals received, and to continuously evaluate a protection radius of the solution provided with a level of confidence compatible with navigation safety requirements.

In the case of the GSC method, matched filtering is performed according to delays and dopplers (so-called "code and carrier phases"), by correlating the GNSS signals received with the expected signals for the expected positions.

The local signal code has a fixed phase on transmission by the satellite. The predicted reception phase of the signal is adjusted according to the movement of the satellite (whose trajectory is calculated according to ephemerides) and for the different hypotheses of positions and dates of reception (the receiver's time base being assumed to be synchronized beforehand by a classic PVT calculation to within a hundred nanoseconds). The phase of the signal actually received by the receiver evolves naturally with time and according to the expected position. Perfect adaptation and maximization of likelihood are achieved when the phase of the received signal corresponds to the phase of the signals expected for the expected reference position.

Such consistency between actual signals received and expected signals at the various expected positions cannot, of course, be perfectly guaranteed, if only because:

The error in synchronizing the receiver's local time with GNSS time, which leads to inaccurate estimates and even instability over time, System and propagation errors that are not perfectly corrected by the models (ionospheric, tropospheric, antenna lever arm, ephemeris and satellite time synchro errors, etc.).

Expected positions are inaccurate (train garage to the nearest meter)

Georeferencing of expected positions is itself flawed

The correlation functions of the various satellites are therefore not all centered exactly around the same power maximum, since differences in synchronization between received satellite signals_which are due to satellite clock errors, ionospheric and tropospheric propagation delays, and multiple paths_result in shifts in the spatial correlation function.

The GSC approach, while offering a more robust solution than conventional solutions for implementing GNSS signals through a PVT, suffers like other solutions from the low level of signals received and the distortion of correlation functions obtained after adapted filtering in the presence of interference and multipath.

On the other hand, the transformation of a propagation delay into a position on a constrained trajectory is not always unequivocal, as it depends on the angle between the direction of motion of the mobile and the direction of incidence of the signal. Spatial ambiguities, linked to the geometric distribution of the sources, also depend on the relative powers of the signals, with one ambiguous signal significantly more powerful than the others potentially dragging down the entire resolution. Although the number of signal sources is generally sufficient to introduce a diversity of angles of arrival that makes such resolution ambiguity situations rare, it is necessary to limit their occurrence and to be able to monitor the risk of their occurrence in the case of critical navigation applications that require a high level of availability and integrity of localization solutions.

The present invention proposes a solution for checking the integrity of the position provided using the GSC approach. This solution takes advantage of the ability offered by the lookout location method to test the suitability of a hypothetical, but precisely defined, position using the observed correlation function of the signals received, thus enabling each of the received signals to test whether or not it is in the vicinity of a correlation maximum.

Patent [D1] describes a particular embodiment of passage detection, by matched filtering of the received signal with a set of expected reference signals (so-called local codes), whose code and carrier phases are predicted for a known reference reception position, from the propagation delays and dopplers of the direct signals to be received at this point, calculated on the basis of the known positions and speeds of the transmitters.

For code phase prediction, it is necessary to correct (during local code generation) the expected satellite distances using available error models, supplied by an on-board GNSS receiver or via a support link (providing clock error models, tropospheric & ionospheric error models), to reduce them to a few meters (excluding multipath and interference).

To cover the local synchronization imprecision, several adapted filters are carried out in parallel, corresponding to the signals to be received at the various possible expected train positions, calculated for different local time registration hypotheses in order to cover the time uncertainty domain.

The position and reset date for which correlation is at a maximum are then taken as the most probable position and synchronization correction for the train.

Patent EP3751315 [D2] proposes an adaptation of the previous patent, extending the principle of the virtual reference beacon to the case of stationary trains, in order to be able to automatically identify the train's departure track after it has started up, without any movement on the part of the carrier, a problem which cannot be solved by the above-mentioned patent, nor reliably by standard GNSS location receivers.

It describes a solution for comparing the plausibility of several location hypotheses at train start-up corresponding to predetermined and known parking positions, by checking the consistency of the GNSS signals received with the GNSS signals expected for these different positions.

The processing proposed in the patent consists in performing a global (complex) correlation between the signal received on the on-board antenna and all the local codes of the visible satellites, synchronized with the expected phases (code and carrier) of the satellite signals at the current time and, for each of the hypotheses of the possible known expected positions.

The position selected is the one that maximizes the signal-to-noise ratio obtained, among all expected reference position hypotheses, after coherent or non-coherent summation of the correlation outputs obtained for all processed satellites.

Here, the possible receiving positions are given by a tight grid of positions on the rails which constitute the set of hypotheses for the train's restart positions, to be evaluated in parallel and no longer successively in time as is the case in patent [D1].

However, the ever-present possibility of distortions in the received signal, linked to multiple paths or local interference, can induce position errors well in excess of the channel spacing, thus running the risk of rendering channel determination unsafe, even after long integration of the calculated position.

These errors, of the order of several tens of nanoseconds (say 200 ns, or 60 m on pseudodistances), mean that the positions of correlation maxima between satellites may be spread out, with the risk of the user not being alerted.

A protection radius associated with a fault detection barrier is thus defined by the ability of an integrity check to detect faults likely to cause position errors at least equal to this radius.

To ensure the integrity of the solution provided by the method, a supervisor (position integrity monitor) is associated with the positioning process, enabling the alarm to be raised in the event of an error for a protection radius and for a risk set by the system's safety requirements.

Limitations

In practice, consistency between the actual GNSS signals received by the GNSS receiver at the current time t and the expected, predicted and calculated replica signals at the various reference positions P(i), i varying from 1 to $N_{Be}$, cannot be perfectly ensured, due to:

The error in synchronizing the local time of the GNSS receiver with the time of the GNSS system, which involves estimation inaccuracy and even instability over time, caused by the intrinsic inaccuracy of the GNSS receiver's local time base (e.g. a temperature-compensated oscillating quartz crystal), which is greater than the inaccuracy of the GNSS system's time base (generally an atomic clock complying with space flight constraints);

GNSS-specific errors and radio signal propagation errors that are not perfectly corrected by the various compensation models, such as ionospheric and/or tropospheric propagation errors, antenna lever arm effects, ephemeris and time synchronization errors between satellites.

The shifts of the satellite signal correlation function maxima around the actual position, which depends on the directions of arrival of the signals, create a scattering halo that can lead to ambiguity in the resolution of the position of the maximum once the correlation functions have been summed, without it being possible to assess the magnitude of the error thus obtained.

In the case of a moving receiver, the correlation function is automatically scanned as the carrier moves. A passage close to the virtual reference beacon is only detected if the multi-satellite correlation function has a sufficiently large maximum, based on a signal-to-noise ratio threshold to be agreed based on the desired confidence.

If a multi-satellite correlation maximum is indeed detected, one could, like a RAIM, estimate an uncertainty on the position of this maximum from the distribution of the positions of the maxima of the elementary correlation functions of the satellites around the multi-satellite maximum, in the manner of the distribution of pseudodistance errors, and then calculate a protection radius as a function of the distribution of errors and the probabilities of false alarms or non-detection of one (or more) anomalies of these errors to identify the existence of a significant bias.

However, the accumulation of such margins leads to protective radii that often appear far greater than the visible short-term inaccuracy.

Hence the need to implement a dedicated integrity check for the position-finding method, based on monitoring the offset error of the correlation maxima, an indicator of the magnitude of the possible position error.

SUMMARY OF THE INVENTION

The integrity control algorithm of the present invention detects and excludes reference signals which, if taken into account, would be likely to bias the position estimate beyond a tolerated error threshold, and associates a protective radius to the expected position error associated with this exclusion.

The principle of checking the integrity of position determination as close as possible to a set of predefined reference positions consists in retaining, for each position tested (known as the "position hypothesis" or "virtual reference beacon position"), only those satellites whose correlation function shows a maximum in the vicinity of the position hypothesis considered.

It should be remembered that the principle of such position determination by maximum likelihood, in accordance with the GSC approach implemented by [D1] and [D2], consists in accumulating, for each of the reference position hypotheses tested, the powers resulting from adapted filtering between the received signal and the signals expected for each of the satellites visible for these positions.

This principle involves accumulating correlation functions for each of these positions, in principle set close to their maximum, but with a dispersion of delays due to standard imperfections in propagation correction models, synchronization errors at satellite and receiver level, and thermal noise.

Added to this are all kinds of biases, not modeled by nature, affecting the correlation function of the received signal, such as interference sources, multipath, common biases affecting the receiver, such as local reference time biases or RF biases.

Integrity control adjustment then consists in defining the thresholds of the detection barriers for these biases so as to exclude them as reliably as possible from the position resolution, while remaining compatible with the standard error distribution.

It should also be pointed out that the determination of the most probable position among a set of expected positions, carried out by maximum likelihood search, is based on the simple accumulation of correlation outputs over the set of signals, which does not depend on the direction of incidence of the signals, and in this respect remains a purely energetic approach.

This approach thus preserves (in the absence of bias) the linearity of the position determination with respect to the distribution of standard delay errors, the delay position of the maximum obtained after cumulating the individual correlation functions of the signals corresponding to the average (weighted by the individual signal powers) of the individual delay errors, and the variance of the delay error of the cumulated maximum resulting from the weighted root mean square of the individual errors.

Such direct linearity with respect to the distribution of individual errors is not guaranteed in the case of PVT position resolution, which requires a spatial transformation between the distribution of individual delay errors and the resulting position errors, which can lead to a significant elongation of the uncertainty space for certain geometric configurations of signal arrival angles (measured by the dilution of precision, or DOP).

In this way, the integrity check of the position determination on the lookout is based on a simple check of the dispersion of the correlation delays and not of their projection in a spatial reference frame, and as such is applicable to the time correlation function of the received signals.

Benefits Provided

The main advantage of testing the suitability of a known hypothetical position is that it makes it possible to evaluate, by maximum correlation, whether or not the mobile is in the vicinity of one of the possible position references, one of which is known to be located close to the receiver. Such a confirmation test is not possible with conventional GNSS processing, since the position calculated by PVT, used as a reference by RAIM, is itself imprecise and may be biased by an erroneous line of sight.

Another advantage is the increased robustness of the monitoring principle, based solely on an analysis of the level and shape of the spreading code function, compared with the approach conventionally implemented by GNSS receivers, based on the extraction of a delay from the correlation function, using time discriminators or interpolators.

In fact, once it has been established that, for reception situations in a local environment with low disturbance_defined by specular multipaths with low delay (delay less than the chip duration of the spreading code) and power less than the direct path, or narrow-band interference, whose level after spreading of the convolution by the local code is less than the direct level_, the delay position of the correlation maximum remains unchanged (unbiased), while the shape of the code correlation function is distorted by asymmetries. As a result, the maximum-likelihood approach to position determination by accumulating correlation functions, used for GSC positioning, is less sensitive to these local disturbances at reception than approaches based on delay extraction, such as PVT.

For the same reason, it follows that an integrity check device monitoring for the existence of delay bias is more effective by taking into account only the shape of the correlation function, such as the maximum at the center criterion, which remains effective and sensitive in the presence of such multipath or interference, unlike tests using residual measurements extracted from RAIM-type delays, and thus that the protection radius of the MAC-type test is smaller in a terrestrial reception environment, offering better resolution and availability for GSC positioning.

Integrity control applied directly to the shape of the correlation function thus reduces the accumulation of protection margins, linked to error contributions and delay measurement biases, specific to the local reception environment.

Implementing the integrity control barrier in parallel with the GSC maximum likelihood search reduces the number of candidate position hypotheses, retaining only possibly ambiguous positions which, as they evolve with displacement, can be easily eliminated by temporal filtering.

The integrity control algorithm defined in this way applies equally to fixed and mobile platforms.

BRIEF DESCRIPTION OF THE DRAWINGS

The invention will be better understood on reading the description of several embodiments which follows, given by way of example and made with reference to the drawings on which:

FIG. 1 shows the most general implementation of the method for checking the integrity, with common bias compensation, of a point positioning process using virtual beacons.

FIG. 2 illustrates the equivalence between temporal and spatial correlation functions (with and without temporal bias).

FIG. 3 illustrates the principle of the bias detection of the maximum at the center (with and without time bias).

FIG. 4 illustrates how the risk of false alarms associated with the MAC method arises.

FIG. 5 illustrates how the risk of non-detection associated with the MAC method arises.

FIG. 6 describes the principle of adjusting the MAC method's protection radius according to the risk of false alarms and the probability of detection.

FIG. 7 describes a general synoptic diagram for implementing MAC integrity checks.

FIG. 8 describes the process of estimating and correcting the common time bias.

FIG. 9 describes the signal-to-noise ratio estimation process.

FIG. 10 describes a particular, but non-limiting, way of checking MAC integrity in the case of position detection for the rail.

DETAILED DESCRIPTION

The present invention describes a method for monitoring and calculating the protection radius, based on the existence of a correlation maximum of satellite signals in the vicinity of a priori defined reference positions.

The "Maximum At Center" (MAC) test defined by the invention makes it possible to verify, without delay extraction, that the temporal correlation function presents a maximum between at least 2 Advance-Delay correlation snippets, the method making it possible to reject satellites which, for the reference position considered, present a maximum more than to Posing, P(Sk,Bl), the power of the middle correlation point for signal Sk and reference position Bi, said Punctual channel, E(Sk,Bl), the power of the advance channel (shifted by $-\tau_0$ relative to the correlation point), said Early channel, L(Sk,Bl), the power of the delay channel (shifted by $+\tau_0$ from the correlation point), said Late channel.

By writing, in accordance with the expressions (f.6) and (f.7) given in the appendix, $$P(Sk,Bl) = \int_{Tint} S_k(t) \cdot C_k^*(t - \tau_{Bl}) dt + \int_{Tint} N(t) \cdot C_k^*(t - \tau_{Bl}) dt$$

$$E(Sk,Bl) = \int_{Tint} S_k(t) \cdot C_k^*(t - \tau_{Bl} - \tau_0) dt + \int_{Tint} N(t) \cdot C_k^*(t - \tau_{Bl} - \tau_0) dt$$

$$L(Sk,Bl) = \int_{Tint} S_k(t) \cdot C_k^*(t - \tau_{Bl} + \tau_0) dt + \int_{Tint} N(t) \cdot C_k^*(t - \tau_{Bl} + \tau_0) dt$$

Then, the decision test to detect the presence of a bias is written:

$$(P(Sk,Bl) < E(Sk,Bl)) \cup (P(Sk,Bl) < L(Sk,Bl))$$

It implies that, for any position hypothesis corresponding to signals delayed in time by more than to from the true position with regard to the direction of the associated signals, most satellite signals will not be retained (except those located on the same wavefront), and therefore the level of the cumulative (multi-satellite) correlation function for these other position hypotheses will be low.

However, for the position hypothesis corresponding to the true position, not all satellites will be retained, in particular those with biases greater than to (thus avoiding a "spreading" of the generalized spatial correlation function). Only satellites whose errors remain compatible with the lag deviation are selected.

The impact of wrongly taking into account a satellite's correlation contribution in calculating the true beacon's correlation level, which would in fact be biased, but which would be seen by the integrity check as compatible with the beacon's correlation domain (due to the measurement error), is in fact relatively small if the integrity check rate is the same as the position estimation rate, since this error merely confirms a "good" choice.

The central maximum verification test allows you to:
On the one hand, we can easily reject most position hypotheses that are too far from the true position,
On the other hand, if we are testing the true position, we can reject erroneous signals (satellite time bias or excessive propagation delay),
And also, to reject satellites that are not erroneous but which, at too low SNR, present a correlation function that is too noisy.

However, if the signal-to-noise ratio is too low, it is still possible that estimates of correlation values are too noisy, and that a signal delayed by more than to may still show a maximum at the midpoint (statistically rare but possible).

To mitigate this risk, an additional sorting is applied to the minimum signal-to-noise ratio of the signals participating in the multi-satellite accumulation.

With an increase in computational load, the maximum-at-center principle, detailed hereafter with 3 correlation points, can be extended, in a further embodiment, for a larger number of correlation points, e.g. 13 offset values between −90 ns and +90 ns, every 15 ns, in order to filter the individual correlation functions by time interpolation and check that the maximum lies within a delay range related to the protection radius.

Such filtering helps to reduce the impact of additional noise and model uncertainties, and thus to reduce the risk of non-detection or false alarms associated with this criterion.

In a simple embodiment, the process would involve using at least 3 correlation points, known as "early-punctual-late" (EPL), spaced by the value of the standard code phase inaccuracy (which depends on the integration time of the correlation function), and checking that the maximum is at the center.

However, as with any detection system, the integrity check test may wrongly inform the positioning algorithm that a signal is erroneous, or fail to detect that a signal is erroneous, precisely because an error in estimating the biased measurement compensates for the actual bias (including geometric error).

The "maximum-at-center" test checks for faults at the level of individual satellite signals, providing protection against the delay bias of each satellite signal that exceeds an early-late time offset ($\tau_0$) determined to ensure the risks of non-integrity and non-continuity required for integrity testing.

The minimum positional protection radius is deduced from the value of the early-late lag-time offset ($\tau_0$) and a geometric dilution coefficient depending on the spatial distribution of the received signals.

The value chosen for this offset is directly conditioned by the objectives set in terms of:

Pfa, corresponding to the probability that a true maximum will not be detected (thereby introducing a break in the continuity of the positioning service), described in accordance with the expression (f.3) given in the appendix, as:

$$Pfa=p\{(P(Sk,Bl)<E(Sk,Bl))\cup(P(Sk,Bl)<L(Sk,Bl))\}$$

Pnd, corresponding to the probability that a true error will not be detected (loss of integrity) described in accordance with expression (f.25) given in the appendix, in the form:

$$Pnd=p\{(P(Sk,Bl)>E(Sk,Bl))\cap(P(Sk,Bl)>L(Sk,Bl))\}$$

The loss of continuity is linked to the Pfa and the loss of integrity is linked to the Pnd associated with the probability of occurrence of the error.

The offset value also has a direct influence on the availability of the integrity check (the smaller the offset, the fewer the number of satellites retained).

These probabilities depend directly on:
Time offset value
Spreading the correlation function
Signal-to-noise ratio
For a given type of spreading code, and for a typical reception CN0, it is possible to calculate the objective values of Pnd and Pfa according to the expressions developed in the appendix.

In accordance with the expression (f.24) given in the appendix, Pfa can be written as follows:

$$Pfa = N_{sat} \cdot \left(1 - \mathrm{erf}\left(\frac{\sqrt{SNR_k \cdot \sqrt{\frac{T_{NC}}{T_c}}\left(1 - \frac{\Gamma_{Ck}(\tau_0)}{\Gamma_{Ck}(\tau_0)}\right)}}{2}\right)\right)$$

Pnd is written as f.36 in the appendix:

$$Pnd < 0.5 \cdot \left(1 - \mathrm{erf}\left(\frac{\sqrt{SNR_k \cdot \left(1 - \frac{\Gamma_{Ck}(\tau_0)}{\Gamma_{Ck}(\tau_0)}\right)}}{2}\right)\right)$$

where $\Gamma_{Ck}(\tau_0)$ represents the level of the correlation function of the k-spreading code for the time delay ($\tau_0$)

The complete development of the analytical formulation of the bias detection confidence, characterized by the values of (Pnd, Pfa, SNR, TTA), associated with the threshold $\tau_0$ is provided as an appendix to the present invention.

This method makes it possible to reject satellites which, for the position under consideration, have a maximum distance of more than $\tau_0$.

Assuming that at least 3 satellites are visible simultaneously, and that all of them are selected by the MAC's detection barrier, then a majorizing expression for the protection radius in position on the horizontal plane is given, in accordance with expression (f.35) in the appendix, by:

$$RP = \tau_0 \times \min_{(i,j)\in Ns\times Ns}\left[\left(\frac{1}{\cos(El_i)} \times \frac{1}{\cos(El_j)}\right) \times \frac{1}{\sin(Az_i - Az_j)}\right]$$

where,
$\tau_0$ is the time offset of the early and late channels of the MAC detection barrier
$N_s$ represents the set of satellites selected by the MAC algorithm (i,j) is an index pair i and j among these satellites $Az_i$ is the azimuth angle (relative to north) of the satellite signal i $El_i$ is the elevation angle (relative to the horizontal plane) of the satellite signal i In one of the rail applications, linked to [D2], we search for the beacon closest to the receiver's actual position, in the case of a sufficiently dense grid of possible positions around a first position estimated by a conventional PVT (i.e. a priori with a sufficiently large PL protection radius of the RAIM).

In this case, the impact of the uncertainty of the receiver's position relative to the mesh, which is less than half the mesh size, must always be less than that due to the noise affecting the correlation function (and therefore indistinguishable from the measurement noise), and have a negligible impact on the detection of any bias.

In this case, therefore, positioning accuracy cannot be lower than the grid, even in the case of ideal reception with no errors in the received signals (error equirrected over +/−half a grid step).

The noises taken into account when establishing the protection radius, and which contribute to the risk of losing position, relate:

The referencing error in tag positions

Residual signal propagation delay correction errors (receiver & satellite clock drift and bias, ionospheric and tropospheric propagation delay, receiver group and antenna delay)

Multipath errors under the assumption of diffuse (non-specular) reflections, which can be modelled by a statistical distribution Noise estimation of correlation levels after adapted filtering (correlation loss of Satellite & Receiver signals, noise factors, . . . ).

The non-expected biases likely to contribute to the non-integrity of the position are relative:

multipath bias (usually due to specular reflections)

untimely propagation biases not taken into account by correction models. This is particularly true of ionospheric propagation biases at low latitudes, or in the event of perturbation of the Earth's magnetic field.)

correction biases not detected by the GNSS system (satellite orbitography, clock bias, etc.)

undetected HW or SW faults in the receiver and its antenna (RF, SWR, . . . )

In another application case for the rail, related to [D1], of positioning on the lookout for a moving platform, it is assumed that the track has been correctly initialized and that the object of detection is to detect an obligatory passage of the receiver exactly on the position of the reference beacon, without any residual geometric error.

In a global approach, all the inaccuracies in the correction models are taken into account when determining the protection radius, which must correspond to the desired Pfa and Pnd.

Figure 6:
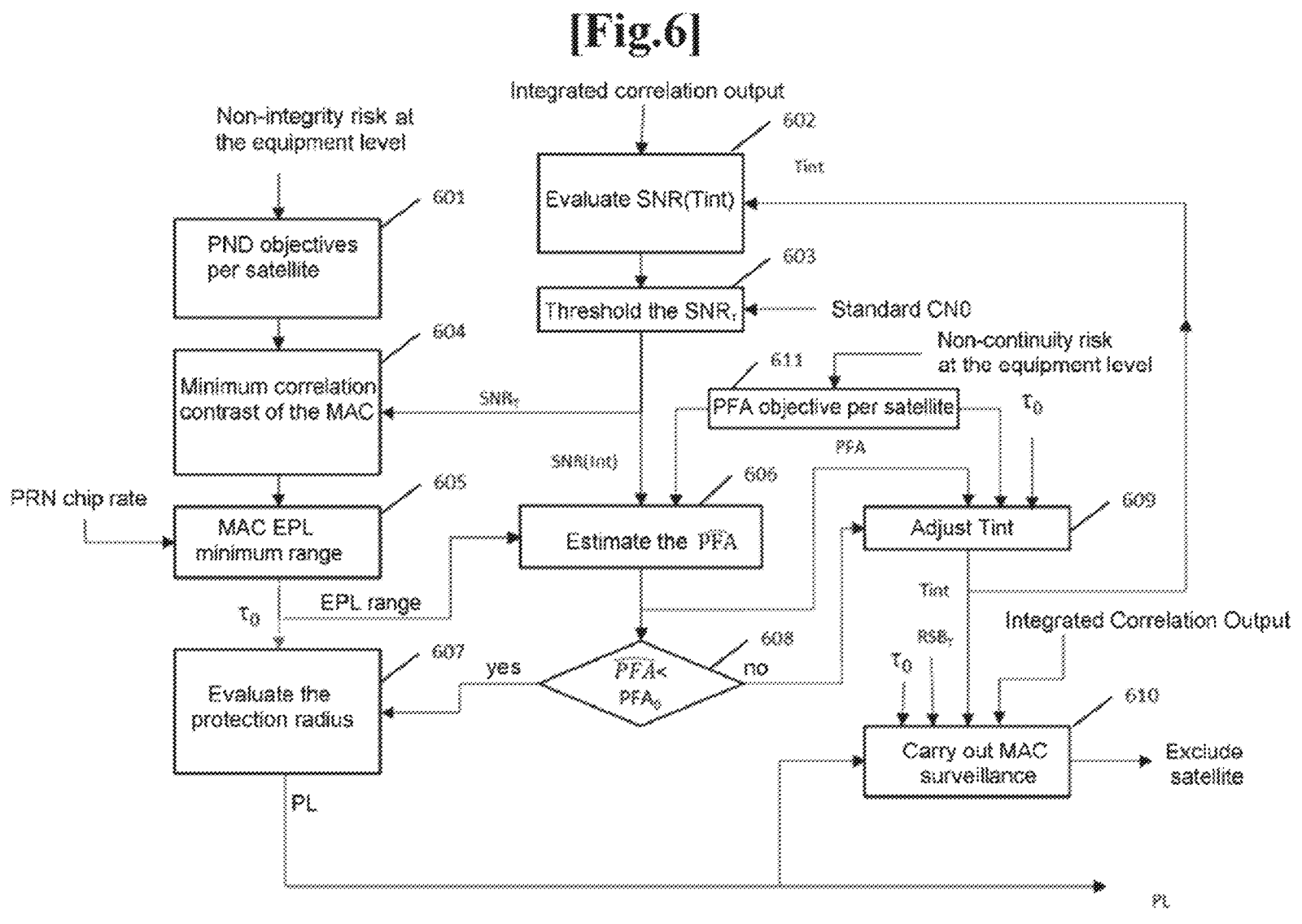

FIG. 6 describes a method for adjusting the protection radius according to the constraints of Pnd, Pfa, and the coherent and non-coherent integration times of matched filtering.

If these errors are too large, it may become impossible to reduce the protection radius below a threshold linked to these residual errors. If they are not sufficiently well appreciated (through their mean and standard deviation), the axes at sight corresponding to excessive non-expected errors will have to be rejected by the integrity control algorithm and declared as biased, resulting in a loss of continuity.

The existence of common receiver biases related to the analog RF group delay of the signal, created by its reception through the antenna, preamplifier, AGC, RF and IF filter stages, prior to digitization, is also likely to reduce the availability of MAC integrity checking and lower the protection radius supported by integrity checking.

This RF bias is indistinguishable from the local clock bias calculated conventionally by a PVT, implying that, in addition to the imprecision of the local time estimate resolved by the PVT, local time is never perfectly synchronized with GNSS reference time, if the common RF bias is not otherwise known. This unprocessed bias in synchronizing the local time scale with GNSS time means that the predicted code phases (even if perfectly estimated by the models) would still be offset by the RF common bias, which can reach several tens of ns.

Moreover, this RF bias is likely to evolve in the short term with the receiver's internal temperature, and also depends in the longer term on the ageing of the electronic components.

Synchronization of the receiver's local time base is assumed to have been previously established and obtained by resolving a PVT from GNSS signals and filtered in the long term by an atomic clock within a typical error range of a few tens of ns over the measurement rate horizon. However, as the PVT resolution is also subject to unexpected non-statistical errors, it is necessary to ensure the integrity of the initial time solution by first performing a GNSS_RAIM or SBAS_RAIM type PVT integrity check, in order to respect the typical local time resolution error.

Since the residual local time resolution error and the residual uncertainty in the RF bias of the receiver are of an order of magnitude equivalent to or greater than the GSC positioning accuracy relative to the beacon network, it is necessary to carry out a continuous estimation of this common bias and to correct the predicted code phases accordingly.

As such an estimate of the common bias is itself dependent on uncertainties in the models and corrections used to calculate the code phases at expected positions, and on any biases that may be added to them, the estimate is defined using an iterative process that enables the elimination of biases specific to the satellite axes and gradual convergence towards the value of the common bias.

The process for estimating and eliminating this bias is integrated into the MAC integrity control process described in the present invention and is detailed in FIG. 8.

DETAILED DESCRIPTION

FIG. 1 shows the most general implementation of the method for checking the integrity of the location obtained by determining the closest position, based on the adapted filtering of received GNSS signals, of a set of georeferenced reference positions for implementation on a mobile or fixed carrier.

The method according to the invention comprises a set of steps, configured to implement a strategy for verifying that the correlation function of the received GNSS signals is consistent with the selected reference position, and characterized in that it comprises:

a. A step E1 (100) to synchronize the process time base with the GNSS time calculated and transmitted by the GNSS positioning system.

b. A step E2 (101) for calculating the code phase of GNSS signals predicted at reception for all said reference positions and for all satellites visible at said reference positions c. A step E3 (103) for calculating the signal-to-noise ratio in the observation band after matched filtering of the received GNSS signals with said predicted GNSS signals d. A step E4 (104) for jointly determining the radius of protection and the duration of integration adapted to the required risks of non-integrity and non-continuity.

e. A step E5 (105), applied to each of said GNSS signals received and each of said reference positions, for calculating the effective level of the channel, called punctual correlation, obtained after adapted filtering of the signal by the local code expected for the code phase, called predicted, compensated for the residual common biases of receiver group delay and GNSS time synchronization, after coherent and non-coherent integration.

f. A step E6 (106), applied to each of said GNSS signals received and each of said reference positions, for calculating the effective level of the channels, referred to as advance correlation and delay correlation, obtained after adapted filtering of the signal by expected local codes shifted by a said fraction of code chip in advance and in delay with respect to the said predicted code phase of the punctual channel, after coherent and non-coherent integration, said code chip fraction being determined so as to comply with the constraint of probability of non-detection of a code phase bias of the signal within a protection radius set by the risk objective of integrity loss associated with the control process.

g. A step E7 (107) for pre-selecting satellite signals suitable for taking part in the position integrity test, based on a minimum signal-to-noise ratio criterion for the "punctual" channel, as calculated in step (E3), to ensure the test's effectiveness in accordance with the non-detection probability and false alarm probability objectives set for the integrity test.

h. A step E8 (108) for excluding satellite signals whose code phases are not compatible with the predicted code phases for said reference positions tested, or which present unexpected delay biases with respect to the predicted code phases due to signal propagation or synchronization disturbances, said satellite exclusion being performed on the basis of a criterion of absence of a Maximum At Center, so-called MAC method, of said early-punctual-late correlation points.

i. A step E9 (109) for calculating, for each of said reference positions, the effective power level obtained, called likelihood, by cumulating the elementary powers of the various selected satellites, after coherent and non-coherent integration.

j. A step E10 (110) for determining the reference position closest to the actual reception position by identifying the reference position with the highest plausibility, within a protection radius compatible with the false alarm and non-detection probability constraints set for the position integrity control method.

FIG. 2 illustrates in (2-1) the equivalence between time synchronization by temporal correlation and position synchronization by spatial correlation. This figure shows a graphical representation, as a function of time, of a temporal correlation function (21) of the received GNSS signal $S_j$ (t) from a geo-positioning satellite Sat(j) with the signal expected at a position of abscissa Xi (240) from a beacon $B_I$ (i) (23) and a delay $\tau$ with respect to the expected synchronization time ti (24) for abscissa Xi.

The length $T_{corr}$ (14) of this time correlation function 21 corresponds to the duration of a chip in a GNSS code sequence. The term "chip", used in GNSS techniques, designates binary information modulating the signal of a GNSS code sequence and differs from the notion of bit, which is used to define a unit of information. For example, the duration of a GPS (Global Positioning System) chip is 1 µs. The maximum 22 of this temporal correlation function 21 is obtained for the synchronization delay $t_i$ of the expected signal with the signal $S_j$ (t) received by the GNSS receiver. (2-1) illustrates that the delay $\tau$ of the correlation maximum (22) is zero when the signal propagation time is perfectly estimated and when the receiver's local time base is perfectly aligned with GNSS time.

FIG. 2 also shows a one-dimensional graphical representation, as a function of the abscissa X around the position of abscissa Xi (240) of the position of the beacon $B_I$ (i), of an equivalent spatial correlation function 210 of the GNSS signal received by the receiver from the geo-positioning satellite Sat(j) with the signal expected at the point $B_I$ (i) of abscissa Xi and at the synchronization time ti The support $X_{corr}$ (140) of this spatial correlation function 220 corresponds to the projection of the temporal correlation support $T_{corr}$ (14) on the axis of variation of the GNSS receiver position around the beacon $B_I$ (i). The spatial correlation support $X_{corr}$ and the temporal correlation support $T_{corr}$ are linked by the formula:

$$X_{corr} = c * T_{corr} / \cos(\alpha j)$$

in which:

$X_{corr}$ denotes the support length of the spatial correlation function;

c is the celerity of light;

$T_{corr}$ denotes the duration of the time correlation function;

$\alpha j$ designates the angle of incidence of the satellite signal emitted by the Sat(j) satellite, j being between 1 and $N_{Sat}$ relative to the direction of travel of the vehicle.

The maximum 220 of this time correlation function 210 corresponds to the abscissa of synchronization of the expected GNSS signal with the signal received by the GNSS receiver from the Sat(j) satellite, and indicates the closest position of the beacon $B_I$(i). Assuming perfect synchronization, the maximum 220 corresponds to the Xi abscissa of position P(i) of beacon $B_I$ (i).

Part (2-2) of FIG. 2 illustrates the displacement of the temporal and spatial correlation functions in the presence of a synchronization bias $\Delta\tau$ on the local time base or a bias DX on the georeferencing of the position reference, leading to a homothetic shift in the position of the correlation maxima on the delay axis (24') and the abscissa axis (240').

Note that in the case of a common time bias affecting all received signals simultaneously and in the same way, the offset induced on the time correlation functions will be identical, whereas the offset along the abscissa will vary with the satellites according to the angle of incidence on the displacement axis, anticipating that the identification of common biases can be obtained by averaging multi-satellite time errors.

FIG. 3 illustrates the principle of time-bias detection by monitoring the Maximum At Center (MAC) on 3 correlation points: early (E), punctual (P) and late (L). The code phase of the punctual correlation point (P) is set to the expected delay of the received signal, and the code phases of the early (E) and late (L) channels are shifted on either side of the expected delay of the punctual channel by a value corresponding to the level of protection expected in position.

Part (3-1) illustrates that the level of the central correlation point remains statistically greater than the lateral correlation points (P>E and P>L) as long as the synchronization error of the received signal remains less than the spacing separating the correlation snippets, thus enabling selection for position determination by maximum likelihood to retain only compatible signals of a given synchronization error distribution.

Part (3-2) illustrates that the level of the punctual correlation point will be statistically exceeded by at least one of the side channels (P<E or P<L) if the signal synchronization error is greater than the spacing between correlation samples. Note that this monitoring principle does not depend on the direction of incidence of the signal. It provides a simple criterion for evaluating the contribution of signals to maximum likelihood, based on adaptive filtering of received signals.

FIG. 4 illustrates a false alarm situation detected by the MAC algorithm, upon reception of a satellite signal Sk (t) on beacon $B_l$, corresponding to a case of no bias (hypothesis H0), but for which the MAC decision test nevertheless detects the presence of an excessive synchronization bias by applying the criterion (P(Sk, Bl)>E(Sk, Bl))∩(P(Sk, Bl)>L (Sk, Bl)) criterion, since in the illustrated case, E(Sk, Bl)>P (Sk, Bl)>L(Sk, Bl)

(410) represents the envelope of the correlation function $\Gamma_{HO}$ (Sk, Bl) of the signal $S_k$(t) with the local code synchronized to the reception time t0 (422) expected for beacon $B_l$ $\tau_0$ (421) designates the delay applied between the Early-Punctual (E-P) and Punctual-Late (P-L) correlation samples of the local code $\tau_{Bl}$ (420) denotes the residual synchronization error of the local code with respect to the expected theoretical reception time t0, due to phase noise and model errors (a priori low in the absence of any other significant bias).

(411), (412), (413) represent the theoretical power levels in the absence of correlation function estimation noise, for the early (E), punctual (P) and late (L) channels respectively.

(414), (415), (416) represent an occurrence of power levels actually obtained by taking into account the correlation function estimation noise, respectively of the early (E), punctual (P) and late (L) channels (417), (418), (419) represent the statistical distribution of the estimation error of the correlation function levels, respectively for the E, P, L channels, in the presence of noise.

This distribution is assumed to be Gaussian, centered on the theoretical level values expected at these points, and with a standard deviation provided by the signal-to-noise ratio measured in the reception band of the punctual channel.

In order to limit the detection error of highly biased signals likely to generate false alarms at low signal-to-noise ratio, a signal selection threshold based on a minimum signal-to-noise ratio criterion (423) is applied beforehand to the MAC algorithm.)

Since the same noise sequence is used to correlate the E, P, L channels, the statistical distribution is the same for each channel. However, due to the microscopic correlation of this noise (essentially thermal noise received via the antenna and shot noise from the receiver), the noises obtained from shifted correlations with the local code are considered independent between the correlation channels.

FIG. 5 illustrates a situation in which the MAC algorithm does not detect a synchronization bias when receiving a satellite signal $S_k$ (t) on beacon $B_l$, despite the presence of a real bias (hypothesis H1), but for which the MAC decision test does not detect the presence of an excessive bias by applying the criterion (P($S_k$, Bl)>E($S_k$, Bl)) ∩(P($S_k$, Bl)>L ($S_k$, Bl)) since, in the illustrated case, (E($S_k$, Bl)<P($S_k$, Bl) et L($S_k$, Bl)<P($S_k$, Bl))

(510) represents the envelope of the correlation function $\Gamma_{HO}$ ($S_k$,$B_l$) of the signal $S_k$ (t) with the local code synchronized to the reception time to (422) expected for the beacon $B_l$ $\tau_0$ (521) designates the delay applied between the Early-Punctual (E-P) and Punctual-Retard (P-L) correlation samples of the local code.

$\tau_{Bl}$(520) denotes the residual synchronization error of the local code with respect to the expected theoretical reception time t0 (522), due to phase noise and model errors (a priori low in the absence of any other significant bias).

$\tau_{Biais}$ (520) designates an additional synchronization bias of the local code with respect to the expected theoretical reception time t0 (522), due to signal propagation hazards, the presence of common time biases (of the local clock bias type or an uncompensated RF group delay of the receiver).

(511), (512), (513) represent the theoretical power levels in the absence of correlation function estimation noise, for the early (E), punctual (P) and late (L) channels respectively.

(514), (515), (516) represent an occurrence of power levels actually obtained by taking into account the correlation function estimation noise, respectively of the early (E), punctual (P) and late (L) channels (517), (518), (519) represent the statistical distribution of the estimation error of the correlation function levels, respectively for the E, P, L channels, in the presence of noise.

As in FIG. 4, this distribution is assumed to be Gaussian, centered on the values of theoretical levels expected at these points, and of standard deviation provided by the signal-to-noise ratio measured in the reception band of the punctual channel.

In order to limit the detection error cases of highly biased signals likely to generate non-detections at low signal-to-noise ratio, a signal selection threshold based on a minimum signal-to-noise ratio criterion (523) is applied beforehand to the MAC algorithm.

FIG. 6 describes the method of jointly determining the protection radius and the integration time, according to step E4, adapted to the risk of non-integrity and non-continuity of the control process, characterized in that:

The Pnd expected from satellite monitoring is derived from the risk of loss of integrity set at equipment level (601)

The satellite targeted correlation contrast, defined by the product $$SNR_k \cdot \sqrt{\frac{T_{NC}}{T_c}} \left(1 - \frac{\Gamma_{Ck}(\tau_0)}{\Gamma_{Ck}(\tau_0)}\right)$$

is analytically deduced from the expected Pnd value (604)

The Pfa expected from satellite monitoring is derived from the risk of loss of continuity set at equipment level (611).

The coherent and non-coherent integration time is determined from the TTA set at equipment level (609).

The minimum signal-to-noise threshold corresponding to the coherent and non-coherent integration time is calculated from a nominal value of the minimum guaranteed CN0 of GNSS signals at reception (603).

The minimum delay ($\tau_0$) between the punctual channel and the early and late channels, which contributes to the calculation of the integrity control protection radius, is deduced from the targeted correlation contrast, the calculated minimum signal-to-noise ratio threshold and the chip width of the signal's PRN code (605).

The Pfa objective of the integrity check is analytically deduced from the targeted correlation contrast (606).

If the Pfa objective is lower than the expected Pfa, the delay ($\tau_0$) between early-punctual-late channels defines the bias detection threshold of the integrity control protection barrier.

The positional protection radius (607) is calculated from the spacing between the correlation samples of the bias detection barrier at satellite level, assuming that at least 3 satellites are visible simultaneously, and that all are selected by the MAC detection barrier. An expression for the positional protection radius in the horizontal plane is given by $$RP = \tau_0 \times \min_{(i,j)\in Ns \times Ns}\left[\left(\frac{1}{\cos\,(El_i)} \times \frac{1}{\cos\,(El_j)}\right) \times \frac{1}{\sin\,(Az_i - Az_j)}\right]$$

where, (i) $\tau_0$ is the offset of the early and late channels of the MAC detection barrier (ii) Ns represents the set of satellites selected by the MAC algorithm (iii) (i,j) is an index pair i and j among these satellites (iv) Azi is the azimuth angle (relative to north) of the satellite signal i (v) Ell is the elevation angle (relative to the horizontal plane) of the satellite signal i If the protection radius of the integrity check is greater than the limit alarm radius tolerated for the positioning service, the integrity check of the positioning system is declared unfeasible for the expected Pnd and Pfa targets (608).

If the targeted Pfa is higher than expected Pfa, the coherent integration time at the matched filter output is gradually increased (609) to a time equal to the TTA, so as to optimize the output signal-to-noise ratio after matched filtering $$SNR_k \cdot \sqrt{\frac{T_{NC}}{T_c}}$$

(602)

The Pfa objectives (606) and the protection radius (605) are recalculated with the new output signal-to-noise ratio, without modifying the protection radius of the integrity check, according to the analytical formulations in memory (606).

If the recalculated objective Pfa remains higher than the expected Pfa, the positioning system integrity check is declared unfeasible for the expected Pnd and Pfa targets.

If the recalculated objective Pfa is lower than the expected Pfa, the MAC monitoring control can be applied in compliance with the safety targets set at equipment level, and within the calculated protection radius.

FIG. 7 describes a general synoptic diagram of the MAC integrity check, showing in particular the links and interlocking with the processing steps already carried out to determine position on the lookout, as described in patents [D1] and [D2].

(701), (712), (713) indicate as prerequisites for processing, respectively, the steps of calculating the code phases (Pd) of the visible satellite signals for the set of expected positions, synchronizing the receiver's local time base with the reference time of the GNSS system, sources of the signals used, and finally receiving the filtered and digitized antenna GNSS signal. These steps are already in place in the system integrating the process for determining the position on the lookout.

(702) adapts, from the processing of the position determination on the lookout, the process of generating expected GNSS signals Ci (t), calibrated to the predicted code phase, by additionally introducing the correction of the common synchronization bias estimated by the MAC monitoring at the current time, and applied for all expected positions Be (703) repeats the multi-satellite correlation process for the set of expected positions, to perform the appropriate filtering between the received GNSS signal and the expected local signals (704) and (705) deal with the calculation of the signal-to-noise ratio calculated in the reception band, defined by the coherent integration time of the matched filtering correlation, respectively for the calculation of the noise reference alone and then the calculation of the signal-to-noise ratio taking into account the levels of the correlation outputs.

As the signals used by the MAC algorithm are previously selected on the basis of their signal-to-noise ratio, the extraction of the noise level alone after adapted filtering requires particular attention, in order to reject any signal contribution from this reference. This rejection is achieved by correlating the received signal with the local code with the greatest possible delay, so as to leave the signal correlation domain. However, as the signal correlation function is periodic, at the code repetition rate (Tms for GPS C/A), a delay of half a code period (0.5 ms) is used.

In order to eliminate signal contributions linked to signal correlation secondary feedback (typically located at −21 dB with respect to the matched code), one then searches for the minimum level of the noise reference alone among all the correlated signals.

Figure 9:
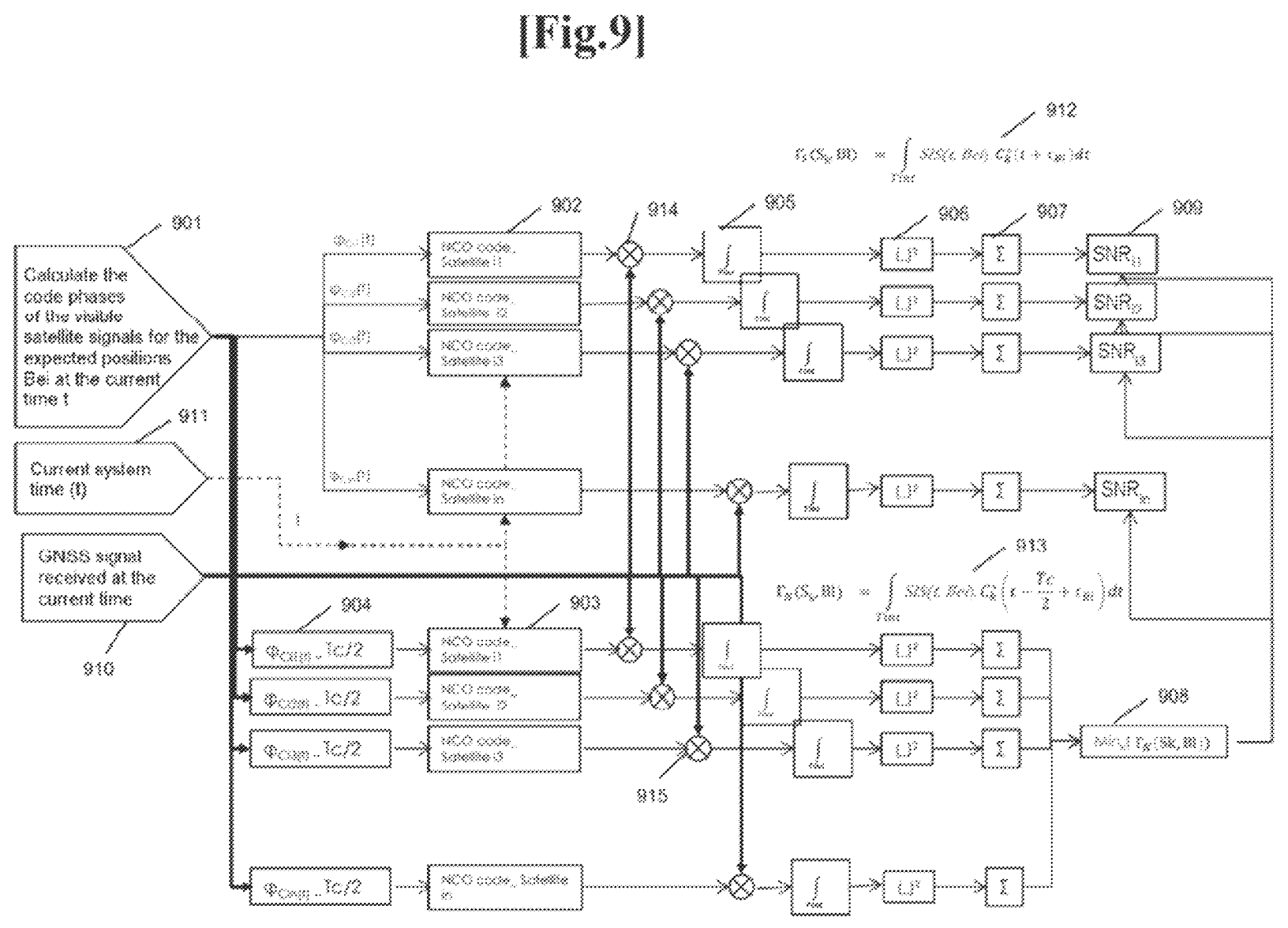

These processing steps are detailed in FIG. 9.

(706) performs a first selection of signals on the basis of the signal-to-noise ratio calculated for the punctual correlation channel, the selection threshold being defined on the basis of the false alarm target set for the equipment (603)

(707) adjusts the protection radius of the MAC algorithm according to the objectives of Pnd and Pfa and the threshold level of the signal-to-noise ratio. This procedure is described in detail in FIG. 6.

(708) applies the MAC algorithm to exclude biased signals beyond the protection radius, and associates the protection radius with the constraints of Pfa and Pnd (709) performs the selection of the reference position closest to the maximum likelihood, as is basically done for position determination on the lookout.

(710) extracts the time error residuals for the most likely position, and detects and determines the existence of a common bias on the predicted code phases. This process is detailed in FIG. 8.

(711) corrects the predicted code phases by the value of the common bias extracted by (710) and maintains the calculation at the current time.

FIG. 8 describes the process used in this invention to estimate and eliminate this bias according to the following steps:

(801) During the start-up phase of the process, first estimation at current time (t) of the most probable position (1-MV) with respect to a grid of possible positions. This GSC estimate is made by calculating the best likelihood, known as the first maximum likelihood, by summing the multi-satellite correlation functions for each expected reference position hypothesis on the grid and determining the position on the grid with the best likelihood, as described by [D1] or [D2], (802) Estimation at current time (t) of the correlation delays, known as residual biases, for each of the received satellite axes, relative to the expected code phases for each received satellite, for the single position of said first maximum likelihood, which, in the absence of non-expected bias, is most likely to have the lowest geometric delays (802). The said residual bias is estimated by extracting, on the delay axis, the maximum correlation of the received signal code with the expected signal code, (803) To perform extraction at the current time (t), application of a multi-point correlation multipath deconvolution method (803), for example using a 5-point double-delta method that covers a large part of the code correlation domain, suitable for cases of specular reflections. Several methods for extracting the code phase (or received time) are known in the art of GNSS receivers to minimize the impact of specular multipath on the received time estimation error. They generally involve a battery of correlation delays distributed around the central correlator (also known as a point correlator), which is time-locked to the expected or continued code phase, (804) Calculation of the mean (M1-MV) of the distribution of residual delay biases at the current time (t) over all satellites received for the position of said first maximum likelihood, (805) Calculation of the variance (V1-MV) of the distribution of residual delay biases at the current time (t) over the set of satellites received for the position of said first maximum likelihood, known as the variance of the biases of the first maximum likelihood, (806) Correction of expected code phases (called corrected expected code phases) at current time (t) by the average residual bias, for all received signals, (807) Refreshment of the most probable position with respect to the grid, at the current time (t), by calculating the best likelihood with respect to said corrected expected code phases, the so-called second maximum likelihood (2-MV), applied to the same received signals, (808) Application of the MAC integrity check process for calculating the protection radius and possible exclusion of faulty view axes, (809) Calculation at current time (t) of corrected correlation delays, called corrected residual bias, for each of the received satellite axes, with respect to said corrected expected code phases for each received satellite. Said corrected residual bias is estimated by extracting, on the delay axis, the maximum correlation of the received signal code with the corrected expected signal code, using the same specular multipath deconvolution method, (810) Calculation of the mean (M2-MV) of the distribution of said corrected residual biases at the current time (t) over all satellites received for the position of said second maximum likelihood, (811) Calculation of the variance (V2-MV) of the distribution of said corrected residual biases at the current time (t) over all the satellites received for the position of said second maximum likelihood, referred to as the variance of the biases of the second maximum likelihood.

(812) Validation of the selection of the second maximum likelihood at the current time (t), by checking that the variance of the variance of the second maximum likelihood is less than the variance of the first maximum likelihood:

(813) If V1_MV>V2_MV, the position of the second maximum likelihood is selected and the residual bias is updated by the corrected residual bias (M2_VM).

(814) If V1_MV<V2_MV, the position of the first maximum likelihood is selected and the residual bias associated with the first maximum likelihood is maintained (M1_MV).

(801) At the next time (t+1), one returns to the step for estimating the new best position likelihood, after correcting the code phases expected at time (t+1) by the average residual bias calculated at time (t), for all the received signals still selected.

FIG. 9 describes the signal-to-noise ratio estimation process with identification of a noise-only reference.

(901), (910), (911) indicate as prerequisites to processing, respectively, the steps of calculating the code phases (Pd) of the visible satellite signals for the expected position, synchronizing the local time base of the receiver with the reference time of the GNSS system source of the signals used and finally receiving the filtered and digitized antenna GNSS signal. These steps are already in place in the system integrating the GSC position determination process.

The series of processes (904) performs a Tc/2 offset of each of the code phases of the received satellite signals on the Be(i) beacon with which the integrity of the received signals is checked (in principle, the one providing the maximum likelihood), where Tc is the length of the PRN code of the received GNSS signal (for example, the offset is 0.5 ms in the case of GPS C/A signals). In the case of weakly periodic signals (such as the pilot channel used by Galileo), this offset can reach up to 50 ms.

The purpose of this offset is to find a noise reference that can be used to calculate the standard deviation of the output noise, after correlation, coherent integration over a period depending on the stationarity of the signal phase (linked to the data phase transition rate) and possible non-coherent integration.)

The series of digital oscillators (NCO code) (902) generates local PRN codes for each of the expected GNSS signals Ci(t), based on the code phase predicted for the expected position Be(i). This processing, designed to provide an estimate of the power level of the signal obtained on the punctual channel (P) after suitable filtering, is carried out on the basis of the position determination processing.

The series of digital oscillators (NCO code) (903) generates local PRN codes for each of the expected GNSS signals Ci(t), shifted by Tc/2 with respect to the code phase predicted for the expected position Be(i). This processing, designed to provide an estimate of the power level of the noise alone on the punctual channel (P) after suitable filtering, is not basically carried out by the position determination processing. These signals are referred to as signal paths.

The complex multiplier banks (914) and (915) multiply the received signal with the local codes generated by the digital oscillators for the signal channels (non-delayed) and the noise channels (delayed by Tc/2). These signals are referred to as noise channels.

Integrators (905) perform coherent integration of multiplied outputs over an identical time for said signal and noise channels.

(912) provides the analytical formulation at the output of adapted filtering for signal channels.

(913) provides the analytical formulation at the output of adapted filtering for noise channels.

In a basic, but not exclusive, version, coherent integration is performed over a duration of 1 ms adapted to GPS signals, but can evolve according to the period of the GNSS codes used, or according to the ability to demodulate in real time the data phase carried by the received signals.

The quadrators (906) detect the complex signals (I&Q) output by matched filtering in the same way for said signal and noise channels.

Integrators (907) perform non-coherent integration of the detected outputs to estimate the signal-to-noise ratio over the same time horizon as the maximum-likelihood position determination.

(908) determines the minimum output power value of the noise channels, in order to select the noise-only reference with the lowest possible signal contribution.

(909) calculates the estimated signal-to-noise ratio for each of the received signals, according to the following formula:

$$RsBi_{sortie} = \frac{E\{(Si + B)_s\} - E\{B_s\}}{\sigma_{B_s}}$$

where, $(S_i + B)_s$ refers to the outputs of signal channels i $B_s$ refers to the output of the noise reference channel noise only

Example of a Special Implementation

FIG. 10 describes a particular, but non-limiting, way of checking MAC integrity in the case of detection on a grid of possible reference positions.

Preferably, the present embodiment is used in the railway field to ensure the integrity of the resolved position of a train, more particularly at start-up, among a set of garage positions known a priori, but also in traffic to enable detection of passage near reference beacons.

The figure describes the main architecture of the device for controlling the integrity of positioning information, in which said device is configured to implement the integrity control process according to the methods of the invention for the expected Pnd and Pfa targets.

(1002) is a GNSS receiver, in this case GPS, preferably capable of integrating the processing of any constellation or multi-constellations, which performs the classic functions of:

a. PVS calculation for satellite position at current time b. Calculation of PVT for an initial estimate of position and time, enabling beacon searches within the uncertainty ranges determined by the protection radii associated with position and time.

c. Calculation of correction models for calculating PVT, and parameterization of model calculations for determining stance when stalking d. Integrity check of position and time calculated by the PVT using standard GNSS algorithms (RAIM_FDE, ARAIM, RAIM-SBAS)

e. Calibration, if the receiver has dedicated internal channels, of the GNSS receiver's internal delay bias.

(1003), known as the Correlation Engine, featuring a dedicated, integrated hardware architecture, performs correlation operations as close as possible to the signal, in order to reduce latency or synchronization bias. To achieve this, the module performs the following operations at the current time:

a. Calculation of geometric distances between satellites and reference beacons, b. Calculation of correction models associated with each satellite c. Calculation of expected code phases d. Correction of common synchronization bias e. Local code generation and correlation with the received signal f. Calculating the signal-to-noise ratio and selecting signals with sufficient SNR g. MAC-based integrity control and exclusion of biased satellites (1004) performs the software functions for maximum likelihood determination, residue observation and common bias estimation at lower rates.

(1001) is a high-resolution geographic database (typically for a horizontal resolution of around one meter) containing the coordinates of georeferenced reference positions and trajectories in a datum compatible with the WGS84 datum used by GPS.

(1005) is an external time base consisting of an ultra-stable atomic clock for long-term filtering of local time, and for maintaining the time base when passing through occulted zones.

The whole of this function is integrated into a device carrying out the processes of the invention, characterized in that it comprises:

a. an antenna, b. a positioning receiver adapted to the acquisition and tracking of time and frequency reference signals, c. a time base, measuring the current time, synchronized with the system time of signal transmission via the positioning receiver, d. geo-referenced mapping of the trajectory and reference points, e. computing means for antenna processing and position determination by detecting a power maximum of the correlation function

POSSIBLE INDUSTRIAL APPLICATIONS OF THE INVENTION

The invention, applied to the point positioning system, is suitable for shorter-term implementation in the railway field to provide a secure solution (integrating within a given protection radius) for locating a train at start-up or at a train stop on a grid of possible reference positions, and for determining the date of passage of a train among a set of reference positions, known as virtual reference beacons, arranged on railway lines.

The principle is also suitable for all forms of positioning using constrained routes with low dynamic variation, such as:

Maritime positioning systems in navigation "rails

Fixed-orbit space communications and navigation systems

Land-based systems for verifying passage at mandatory positions, tolls, customs, etc.

Virtual barrier devices used to confine mobiles or persons to authorized areas

LIST OF DOCUMENTS CITED

[D1]: Patent FR 160 14 49—Revol M.: "Method for point location of a vehicle moving on a constrained trajectory and associated system", registration number: 17194964.7, registration date: May 10, 2017

[D2]: Patent EP3751315—Revol M.: "Method and system for locating a stationary vehicle on a siding using virtual beacons" application number: EP20179133, application date: Oct. 6, 2020

APPENDIX: ANALYTICAL FORMULATION OF THE SOLUTION

Here we describe an analytical formulation of the integrity control algorithm and its settings The desired characteristics of the algorithm are as follows:

Monitor and exclude (integrity check) erroneous signals that could lead to GSC process position errors exceeding a specified alarm radius, Be adapted by design to monitor errors that impact the GSC process Provide a protection radius adapted to the safety objectives imposed on the navigation system (through its Pfa and Pnd characteristics).

Remove specific risks of ambiguity inherent in the spatial correlation function projection method (path indeterminacy)

In a context where the GSC method is mainly used to estimate, based on a received power level criterion for a set of signals, which virtual reference beacon position is closest to the receiver's current position, or at what time the receiver passes closest to this reference position, then;

The risk of non-integrity of the integrity control algorithm expresses the inability of the system to detect that a wrong reference position selection, identified by the GSC process as the best among the possible position hypotheses, is in fact erroneous with a bias located beyond a minimum distance (protection radius) determined for a given confidence index by the permissible non-detection probability of this bias (Pnd).

The risk of non-continuity of the integrity control algorithm expresses the ability of the system to detect that a good reference position, identified by the GSC process as the best among the possible position hypotheses, would in fact be detected as erroneous for a confidence index given by the probability of false alarm admissible in the absence of any bias (Pfa).

The alarm delay (or TTA) expresses the delay between the moment when an erroneous signal entered the GSC position resolution algorithm and the moment when the integrity monitoring algorithm was able to detect it.

Assumption of the Maximum Error Risk:

We define H0 and H1 as the 2 states of the hypothesis on the presence of measurement bias for a given reference position:

H0: none of the measurements is biased (only a centered random noise error exists, with the same distribution for all observables)

H1: at least one measurement is affected by a bias (assumed to be sufficient to disrupt the decision)

We also define the estimated states resulting from the decision (of the MAC integrity control process):

$\widehat{H0}$ integrity test decision that "the reference position is correct" (none of the signals received, and used for GSC positioning, is affected by a bias)

$\widehat{H1}$ detection test decision that "the reference position is wrong" (at least one of the signals received, and used for GSC positioning, is affected by a bias)

The false alarm probability of the test is related to the level of the detection threshold with respect to the statistical distribution of the noise error at the detector output, assuming no bias.

The probability of non-detection of the test is related to the level of the detection threshold with respect to the statistical distribution of the error of the signal added to the noise at the detector output, under the assumption of the existence of a bias.

Thus, minimizing the cost of a false decision means reducing Pfa, indicative of the erroneous reduction in continuity of the positioning service, and Pnd, indicative of the loss of integrity of the positioning service, with the impact of the loss of integrity generally having a catastrophic impact on the critical navigation service, whereas the impact of the loss of continuity tends to have only a major impact.

Pfa represents the probability $p(\widehat{H1}/H0)$:

Pnd represents the probability $p(\widehat{H0}/H1)$

We adopt a conservative approach based on a majoring error principle such that:

if a false alarm occurs on a single satellite axis, the integrity check may wrongly reject the correct position of the reference position in the event of non-detection of bias on a single satellite axis, the integrity check may erroneously retain the incorrect position of the virtual reference beacon These decision states (majoring impact of the error) are very conservative, as the detection of one or more biased signals is not necessarily enough to lead to a wrong decision on the determination of the reference position (depends on the combination of these biases), nor is the non-detection of a single bias sufficient to assert that the reference position is not the right one.

This principle implies applying the MAC integrity check per axis to all visible satellites, and excluding satellites according to the MAC criterion, for each reference position hypothesis explored.

This majority approach also implies that the non-integrity and non-continuity risks tolerated for integrity checks at the reference position level are divided by the number of satellites visible to bring back and perform the integrity check at the level of each satellite.

Signal Subject to MAC Integrity Check

For each satellite signal and each virtual reference beacon position, GSC performs a real-time correlation between the signal received by the receiver, whose position is unknown, and a copy of the expected signal phase-coded, at the current time, with each known virtual reference position.

MAC uses all filtering outputs adapted to each virtual reference position and each satellite to perform the integrity check.

Under assumption H0, the expression for the correlation output signal is written:

$$\Gamma_{H0}(Sk,Bl)=\int_{Tint}S_k(t)\cdot C_k^*(t-\tau_{Bl})dt+\int_{Tint}N(t)\cdot C_k^*(t-\tau_{Bl})dt \tag{f.1}$$

Under hypothesis H1, the expression for the correlation output signal is written:

$$\Gamma_{H1}(Sk,Bl)=\int_{Tint}S_k(t-\tau_{biais})\cdot C_k^*(t-\tau_{Bl})dt+\int_{Tint}N(t)\cdot C_k^*(t-\tau_{Bl})dt \tag{f.2}$$

Where,

Sk designates the satellite k

Bl designates the reference position l $\tau_{Bl}$ is the code phase difference between the Sk signal received at the receiver and the signal expected at the reference position Bl $\tau_{biais}$ designates the delay bias affecting the Sk signal received by the receiver Before any further detection, the matched filtering output signal is a complex signal (I &Q) representative of the amplitude and phase received, not of a power. The coherence integration time determines the equivalent bandwidth in which the matched filtering output is observed.

As soon as quadratic detection is performed on these outputs, the signal-to-noise ratio then reflects the ratio between the received signal power for the correlation delay corresponding to the position of the virtual reference beacon (under assumption H1) and the noise power alone in the observation band (under assumption H0); the signal-to-noise ratio after non-coherent integration increases as the square root of the quadratic integration sample number.

The coherent integration time therefore determines the noise power estimation bandwidth (assumed to be white), and the non-coherent integration time determines the additional gain on the signal-to-noise ratio in this band (SNR) as well as the latency introduced by the integrity control algorithm.

Expression of the Pfa Associated with the MAC Algorithm

In line with the major error assumption, the integrity check is performed per satellite axis, with erroneous satellite axes eliminated from the maximum correlation calculation performed by GSC for each virtual reference beacon position assumption.

Under assumption H0 (no measurement bias), and taking the case of the reference position closest to the receiver's position, then, the Pfa per satellite represents the probability that the MAC algorithm will fail to detect a maximum at the center of the 2 early (E) and late (L) correlation points that frame the punctual correlation path (P) after matched filtering between the received signal and each of the delayed satellite signals of the code phase corresponding to the position of the reference position.

Let be,

P(Sk,Bl), the GSC output punctual channel power for the signal $S_k$ and the reference position $B_l$ E($S_k$,Bl), the power of the early track L($S_k$,Bl), the power of the late channel Then, the probability of a false alarm by satellite is expressed as, $$Pfa=p\{(P(Sk,Bl)<E(Sk,Bl))\cup(P(Sk,Bl)<L(Sk,Bl))\} \tag{f.3}$$

$$Pfa=p\{(P(Sk,Bl)<E(Sk,Bl))\}+p\{(P(Sk,Bl)<L(Sk,Bl))\} \tag{f.4}$$

FIG. 4 illustrates the occurrence of false alarms.

Assuming symmetry of the correlation function in the case of correct selection of the virtual reference tag, in order to reduce the analytical expression, then (E(Sk, Bl)=L(Sk, Bl)) then:

$$Pfa=2\cdot p\{(P(Sk,Bl)<E(Sk,Bl))\}=2\cdot p\{(E(Sk,Bl)-P(Sk,Bl))>0\} \tag{f.5}$$

By writing, $$P(Sk,Bl)=\int_{Tint}S_k(t)\cdot C_k^*(t-\tau_{Bl})dt+\int_{Tint}N(t)\cdot C_k^*(t-\tau_{Bl})dt \tag{f.6}$$

$$E(Sk,Bl)=\int_{Tint}S_k(t)\cdot C_k^*(t-\tau_{Bl}-\tau_0)dt+\int_{Tint}N(t)\cdot C_k^*(t-\tau_{Bl}-\tau_0)dt \tag{f.7}$$

Posing;

$$m_E=\overline{E_{S+N}(Sk,Bl)}=\overline{\int_{Tint}S_k(t)\cdot C_k^*(t-\tau_{Bl}-\tau_0)dt+\int_{Tint}N(t)\cdot C_k^*(t-\tau_{Bl}-\tau_0)dt} \tag{f.8}$$

average in the presence of signal and noise at correlation output (for the forward channel)

$$m_N=\overline{E_N(Sk,Bl)}=\overline{\int_{Tint}N(t)\cdot C_k^*(t-\tau_{Bl}-\tau_0)dt} \tag{f.9}$$

average in the presence of noise alone at correlation output (for the early channel)

$$Sigma_E^2=\overline{(E_{S+N}(Sk,Bl)-m_E)^2} \tag{f.10}$$

the centered variance in the presence of signal and noise alone at the correlation output.

$$Sigma_N^2=\overline{(E_N(Sk,Bl)-m_N)^2} \tag{f.11}$$

the centered variance in the presence of noise alone at the correlation output.

The noise N(t) at the correlation output is centered and independent of the signal.

$$m_E=A_{Sk}\cdot\Gamma_{Ck}(\tau_{Bl}+\tau_0) \tag{f.12}$$

where, $A_{Sk}$ represents the amplitude of the $S_k$ $\Gamma_{Ck}(\tau_{Bl}+\tau_0)$ represents the level of the correlation function of the signal spreading code for the time delay $(\tau_{Bl}+\tau_0)$ $$Sigma_E^2=Sigma_N^2=\Gamma_N(0)\cdot\Gamma_{Ck}(0) \tag{f.13}$$

We express ourselves in the same way, $$m_P=\overline{\int_{Tint}S_k(t)\cdot C_k^*(t-\tau_{Bl})dt+\int_{Tint}N(t)\cdot C_k^*(t-\tau_{Bl})dt}=A_{Sk}\cdot\Gamma_{Ck}(\tau_{Bl}) \tag{f.14}$$

$$Sigma_P^2=Sigma_N^2=\Gamma_N(0)\cdot\Gamma_{Ck}(0) \tag{f.15}$$

Hence, posing $\Delta_{EP}=E(Sk, Bl)-P(Sk, Bl)$;

$$m_{\Delta_{EP}} = m_E - m_P = \tag{f.16}$$

$$A_{Sk}\cdot(\Gamma_{Ck}(\tau_{Bl}+\tau_0)-\Gamma_{Ck}(\tau_{Bl})) = A_{sk}\cdot\left(\frac{\Gamma_{Ck}(\tau_{Bl}+\tau_0)}{\Gamma_{Ck}(\tau_{Bl})}-1\right)\cdot\Gamma_{Ck}(\tau_{Bl})$$

$$Sigma_{\Delta_{EP}}^2=Sigma_E^2+Sigma_P^2=2\cdot Sigma_N^2=2\cdot\Gamma_N(0)\cdot\Gamma_{Ck}(0) \tag{f.17}$$

Assuming that, when determining the probability of false alarm, the most probable reference position in the maximum likelihood sense is close to the receiver's true position, then:

$$\Gamma_{Ck}(\tau_{Bl})\approx\Gamma_{Ck}(0)$$

$$\Gamma_{Ck}(\tau_{Bl}+\tau_0)\approx\Gamma_{Ck}(\tau_0)$$

Hence;

$$m_{\Delta_{EP}} \approx A_{Sk}\cdot\left(\frac{\Gamma_{Ck}(\tau_0)}{\Gamma_{Ck}(0)}-1\right)\cdot\Gamma_{Ck}(0) \tag{f.18}$$

$$\sigma_{\Delta_{EP}}^2 = Sigma_{\Delta_{EP}}^2 = 2\cdot Sigma_N^2 = 2\cdot\Gamma_N(0)\cdot\Gamma_{Ck}(0) \tag{f.19}$$

Local code power is normalized to;

$$\Gamma_{Ck}(0)=1$$

Hence $$m_{\Delta_{EP}} \approx A_{Sk} \cdot \left( \frac{\Gamma_{Ck}(\tau_0)}{\Gamma_{Ck}(0)} - 1 \right) \tag{f.20}$$

$$\sigma^2_{\Delta_{EP}} = 2 \cdot \Gamma_N(0) \tag{f.21}$$

Hence, assuming Gaussian noise, $$\tag{f.22}$$

$$Pfa = 2 \cdot p\{(E(Sk, Bl) - P(Sk, Bl)) > 0\} =$$

$$2 \cdot \int_0^{\infty} \frac{1}{\sqrt{2\pi} \, \sigma_{\Delta_{EP}}} \exp\left( -\frac{(x - m_{\Delta_{EP}})^2}{2\sigma^2_{\Delta_{EP}}} \right) \cdot dx = 1 - \mathrm{erf}\left( \frac{|m_{\Delta_{EP}}|}{\sqrt{2} \, \sigma_{\Delta_{EP}}} \right) =$$

$$1 - \mathrm{erf}\left( \frac{A_{Sk}\left(1 - \frac{\Gamma_{Ck}(\tau_0)}{\Gamma_{Ck}(0)}\right)}{2\sqrt{\Gamma_N(0)}} \right) = 1 - \mathrm{erf}\left( \frac{\sqrt{SNR_k}\left(1 - \frac{\Gamma_{Ck}(\tau_0)}{\Gamma_{Ck}(0)}\right)}{2} \right)$$

This result represents the achievable Pfa at the output of simple coherent integration of the correlation function (e.g. over 20 ms) and in the case of a signal-to-noise ratio SNR received in the coherent integration band, with:

$$RSB_k = \frac{C_k}{N_0} \cdot T_c$$

is the post-correlation signal-to-noise ratio for satellite k estimated in a band 1/Tc, related to the coherent integration time.

$$\left(1 - \frac{\Gamma_{Ck}(\tau_0)}{\Gamma_{Ck}(0)}\right)$$

represents the level differential of the code's correlation function (in power) linked to the distance between the early and punctual correlation points (also identical to the distance between punctual and late correlation points). The greater the spectral spread of the code, the greater the differential. C/N0, is the signal-to-noise ratio of the received signal in 1 Hz (assuming, for Pfa estimation, that the reference position is close to the receiver's actual position) Tc is the coherent integration time.

In the case of additional non-coherent integration ($T_{Nc}$) the signal-to-noise ratio SNR will be increased by 5 log ($T_{Nc}/T_c$).

The expression for the probability of a false alarm by satellite signal then becomes:

$$Pfa = 1 - \mathrm{erf}\left( \frac{\sqrt{SNR_k} \cdot \sqrt{\frac{T_{NC}}{T_c}}\left(1 - \frac{\Gamma_{Ck}(\tau_0)}{\Gamma_{Ck}(\tau_0)}\right)}{2} \right) \tag{f.23}$$

The probability of overall false alarm in position, expressing the wrong rejection of a valid position by the integrity check, when at least one of the signals is declared erroneous, then becomes;

$$Pfa = N_{sat} \cdot \left( 1 - \mathrm{erf}\left( \frac{\sqrt{SNR_k} \cdot \sqrt{\frac{T_{NC}}{T_c}}\left(1 - \frac{\Gamma_{Ck}(\tau_0)}{\Gamma_{Ck}(\tau_0)}\right)}{2} \right) \right) \tag{f.24}$$

where $N_{Sat}$ is the number of satellites used for position detection.

Expression of the Pnd Associated with the MAC Algorithm

Under hypothesis H1 (presence of measurement bias), and assuming a reference position far from the receiver's position, then Pnd represents the probability that the MAC algorithm can still detect a maximum at the center of the 2 early (E) and late (L) correlation points that frame the punctual correlation path (P) after matched filtering between the received signal and each of the delayed satellite signals of the code phase corresponding to the far reference position.

Let be,

P(Sk,Bl), the GSC output punctual channel power for the signal $S_k$ and the reference position $B_l$ E(Sk,Bl), the power of the advancing track L(Sk,Bl), the power of the delay channel Then, $$Pnd = p\{(P(Sk,Bl)>E(Sk,Bl))\cap(P(Sk,Bl)>L(Sk,Bl))\} \tag{f.25}$$

$$Pnd = p\{(P(Sk,Bl)>E(Sk,Bl))\} \cdot p\{(P(Sk,Bl)>L(Sk,Bl))\} \tag{f.26}$$

FIG. 5 illustrates the risk of non-detection.

Assuming, to reduce complexity, that the paths E, P, L are distributed on only one side of the correlation function, e.g. that E, P, L correspond to increasing powers, then:

$$E(Sk,Bl)<P(Sk,Bl)\Rightarrow 1>p(P(Sk,Bl)>E(Sk,Bl))>0.5$$

The same reasoning can be applied if the shift occurs in the other direction, corresponding to decreasing E, P, L powers (since the two symmetrical situations can occur with an equal probability of occurrence of 0.5, we develop only one case of shift with a probability of 1).

Either, $$p\{(P(Sk, Bl) > L(Sk, Bl))\} > Pnd > \frac{1}{2} \cdot p\{(P(Sk, Bl) > L(Sk, Bl))\} \tag{f.27}$$

$$p\{(Sk, Bl) > L(Sk, Bl))\} > Pnd \tag{f.28}$$

Following the same approach as for determining Pfa expression, $$p\{(P(Sk, Bl) > L(Sk, Bl))\} = p\{(P(Sk, Bl) - L(Sk, Bl)) > 0\} \tag{f.29}$$

and $$\tag{f.30}$$

$$p\{(P(Sk, Bl) - L(Sk, Bl)) > 0\} =$$

$$\int_0^{\infty} \frac{1}{\sqrt{2\pi} \, \sigma_{\Delta PL}} \exp\left( -\frac{(x - m_{\Delta PL})^2}{2\sigma^2_{\Delta PL}} \right) \cdot dx$$

with $$m_{\Delta_{PL}} = m_P - m_L = \tag{f.31}$$

$$A_{Sk} \cdot (\Gamma_{Ck}(\tau_{Bl} + \tau_0) - \Gamma_{Ck}(\tau_{Bl})) = A_{Sk} \cdot \left( \frac{\Gamma_{Ck}(\tau_{Bl} + \tau_0)}{\Gamma_{Ck}(\tau_{Bl})} - 1 \right) \cdot \Gamma_{Ck}(\tau_{Bl})$$

$$Sigma^2_{\Delta_{PL}} = Sigma^2_P + Sigma^2_L = 2 \cdot Sigma^2_N = 2 \cdot \Gamma_N(0) \cdot \Gamma_{Ck}(0) \tag{f.32}$$

In contrast to the Pfa expression, where an absence of bias was assumed, i.e. proximity of the reference position to the actual position of the receiver, it was possible to assume that $\tau_{Bl}$ was small in front of the code's correlation support, and therefore that $\Gamma_{Ck}(\tau_{Bl}) \approx \Gamma_{Ck}(0)$ this is no longer permitted without prior precaution in the case of Pnd calculation.

In the case of Pnd, we assume that there is a bias, and we evaluate the risk of not identifying it. This bias in the position of the correlation maximum can be located a priori at any distance from the actual position of the receiver, but still limited to the correlation distance of a 1 µs code chip in the GPS C/A case (300 m).

One difficulty in processing highly biased signals is that their correlation with the local code is bound to be low (due to the large bias), and therefore all the more likely to generate non-detections at low noise ratios.

The approach adopted to overcome this problem is to select only signals with a sufficiently high signal-to-noise ratio, i.e. with low enough biases to cause only a limited number of non-detections due to excessive dispersion of correlation noise.

This threshold on the signal-to-noise ratio must be defined within the coherent integration band of the correlation function.

For example, if we assume a theoretical nominal CN0 of 43 dB/Hz, the SNR in 50 Hz is only 43−17=26 dB, and if we assume a noise figure (NF) of −3 dB at the receiver input, the minimum SNR detection threshold would then be only 23 dB (not counting any non-coherent integrations that could raise the SNR).

Under this assumption, we can again assume that $\Gamma_{Ck}(\tau_{Bl}) \approx \Gamma_{Ck}(0)$ and thus apply an expression equivalent to that for Pfa to calculate Pnd per satellite axis:

$$Pnd < p\{(P(Sk, Bl) - L(Sk, Bl)) > 0\} \qquad \text{(f.33)}$$

$$\text{(f.34)}$$

$$Pnd < 0,5 \cdot \left(1 - \text{erf}\left(\frac{|m_{\Delta PL}|}{\sqrt{2}\,\sigma_{\Delta PL}}\right)\right) =$$

$$0,5 \cdot \left(1 - \text{erf}\left(\frac{A_{Sk}\left(1 - \frac{\Gamma_{Ck}(\tau_0)}{\Gamma_{Ck}(0)}\right)}{2\sqrt{\Gamma_N(0)}}\right)\right) =$$

$$0,5 \cdot \left(1 - \text{erf}\left(\frac{\sqrt{SNR_k\left(1 - \frac{\Gamma_{Ck}(\tau_0)}{\Gamma_{Ck}(0)}\right)}}{2}\right)\right)$$

The probability of non-detection of a global position error is taken directly from this expression of Pnd per signal, bearing in mind that we're not interested here in satellite failures _which should then be considered equiprobable, but with a very low rate of occurrence (~$10^{-4}$/h)_, but in signal biases created by the nearby environment_considered certain with a rate of occurrence of 1_ described, under the assumption of the risk of error major, such that "at least one measurement is affected by a bias" (whatever the satellite), knowing that in real conditions, several satellite signals are generally affected simultaneously by the presence of multipath or interference, thus estimating a major risk of non-detection.

Calculating the Protection Radius Associated with the MAC

The protection radius (PR) defines the minimum level of position error below which the barrier, used to perform the integrity check, cannot successfully detect the existence of elementary measurement biases leading to this position error with the desired confidence and warning time.

The positional protection radius is therefore representative of the blind coverage area of the bias detection test, and thus of the positional error range for which it is not possible to monitor the integrity of the position determination. It is assumed that the risk of position non-integrity cannot be covered by the integrity monitoring process below this minimum error, and that only errors of greater amplitude can be identified by the barriers put in place.

The detection threshold of the fault monitoring barrier at the level of the individual satellite signals is thus determined by the ability to detect faults likely to cause a reference position selection error at least equal to the protection radius.

In the case of the MAC algorithm, PR is derived from the detection threshold ($\tau_0$), taking into account the possibility that reference positions different from the closest reference position may still be retained by a maximum likelihood test, while simultaneously respecting the zone of non-coverage in the delay of the MAC test (so-called blind zones).

This extension of the ambiguity domain of the positions selected by maximum likelihood is defined by the intersection of the indeterminacy rings of the signals wave fronts, defined by the blind zone $\tau_0$ of the MAC algorithm's barrier detection test, projected onto the horizontal plane.

The overlap domain of the blind rings of 2 satellite wave planes separated by an angle of incidence $\Delta\alpha$ is maximally stretched as a function of $$\left(\frac{1}{\sin(\Delta\alpha)}\right)$$

indicating that the area of ambiguity at the intersection of the wave planes becomes very large if the angular distance separating the two satellite axes is small.

In the presence of at least one $3^{rd}$ satellite, with reception power equivalent to that of the first 2 and sufficiently separated in terms of angle of incidence, the ambiguity zones, linked to the superposition of the blind rings of synchronization of the wave planes of the first 2, are resolved by the maximum likelihood algorithm, which among the possible reference positions will retain only that compatible with the intersection of the 3 wave planes.

So, when at least 3 satellites, with a sufficient signal-to-noise ratio, can be used by maximum likelihood to evaluate a set of possible reference positions, then the position ambiguity zone results from the smallest extension of all possible intersection pairs.

Assuming that at least 3 satellites are visible simultaneously, and that all of them are selected by the MAC's detection barrier, then a majorizing expression for the protection radius in position on the horizontal plane for this smallest extension is given by:

$$RP = \tau_0 \times \min_{(i,j)\in Ns\times Ns}\left[\left(\frac{1}{\cos(El_i)} \times \frac{1}{\cos(El_j)}\right) \times \frac{1}{\sin(Az_i - Az_j)}\right] \qquad \text{(f.35)}$$

$\tau_0$ is the offset of the early and late channels of the MAC detection barrier Ns represents the set of satellites selected by the MAC algorithm (i,j) is an index pair i and j among these satellites $Az_i$ is the azimuth angle (with respect to north) of the satellite signal i $El_i$ is the elevation angle (relative to the horizontal plane) of the satellite signal i In the case of PVT integrity monitoring used in aeronautical solutions, only errors that are linked to satellite failures and not detected by the GNSS system are retained, and it is assumed that the local environment and the receiver itself are sufficiently well defined and controlled elsewhere that there is no need to monitor them. RAIM therefore focuses on rare, one-off satellite failures ($\#10^{-4}$ occurrences/hour), whose rate of occurrence in itself helps to target very low non-integrity risks of the order of $10^{-7}$ per hour; in these cases, the probability of non-detection by the RAIM integrity control algorithm remains at a reasonable level of the order of $10^{-3}$.

This is no longer the case for land-based navigation solutions, since multiple sources of error can coexist simultaneously.

Multipaths linked to the local environment close to the receiver are particularly daunting for terrestrial navigation applications, and in particular for rail, if we consider that it is not possible to predict them with sufficient confidence in all situations.

Unlike residual GNSS system failures, the occurrence of measurement bias due to multipath may be significant, and the uncertainty over their possible appearance on several satellite axes at the same time leads to retain the assumption of an occurrence rate equal to 1, and therefore to focus all integrity control capacity on local monitoring of measurement errors. The prediction of the performance of this monitoring is therefore limited to the validity of the statistical distribution of errors, which is difficult to model for the tails of the distribution, particularly for the detection of rare events that are difficult to fit into statistical models.

For this reason, it will be difficult to deal with non-integrity risks of less than, say, $10^{-5}$, which implies seeking solutions at system level rather than equipment level, for example through dissimilar redundancies.

Thus, based on the expression of Pnd $$Pnd < 0.5 \cdot \left( 1 - \mathrm{erf}\left( \frac{\sqrt{SNR_k\left(1 - \frac{\Gamma_{Ck}(\tau_0)}{\Gamma_{Ck}(0)}\right)}}{2} \right) \right) \tag{f.36}$$

The procedure for calculating the protection radius is as follows:

a. The non-integrity risk is firstly allocated to the navigation equipment
b. The probability of non-detection to be attributed to the integrity control module (MAC) is deduced, taking into account the estimated or assessed rate of occurrence of errors.
c. We define the satellites' minimum signal-to-noise ratio to be monitored
d. We determine the minimum discrimination (or "contrast") ratio $$\left(1 - \frac{\Gamma_{Ck}(\tau_0)}{\Gamma_{Ck}(0)}\right)$$

to be provided by the spreading code used by MAC integrity checking
e. Given the shape of the spatial correlation function linked to the code chip envelop, we determine the minimum distance between the correlation points of the MAC integrity check. This distance depends essentially on:

i. the code spreading band, which differs from one constellation to another, and even from one frequency to another (e.g. Galileo/GPS, or E1/E5)
  ii. Receiver bandwidth, which must be as wide as possible to benefit from code spreading and achieve spatial resolutions of a few meters; for example, 6 m (20 ns) resolution implies a receiver bandwidth of at least 50 MHz.

f. From the spacing between the correlation snippets of the bias detection barrier at satellite level, we calculate the positional protection radius, if at least 3 satellites are visible simultaneously, according to expression (f.35).

FIG. 6 shows the principle of setting up the MAC method.

The adjustment principle makes it possible to adjust the protection radius to the risks of non-integrity and non-continuity required for the control process during which:

(1) The expected Pnd monitoring performance by single satellite s derived from the risk of loss of integrity set at equipment level.
(2) The satellite targeted correlation contrast, defined by the product $$SNR_k \cdot \sqrt{\frac{T_{NC}}{T_c}}\left(1 - \frac{\Gamma_{Ck}(\tau_0)}{\Gamma_{Ck}(0)}\right)$$

is deduced from the value of Pnd expected according to the analytical formulation (f.34)
(3) The expected Pfa monitoring performance by single satellite is derived from the risk of loss of continuity set at equipment level according to the formula (f.24) provided in the appendix.
(4) The coherent and non-coherent integration time is determined from the TTA set at equipment level.
(5) The minimum signal-to-noise threshold corresponding to the coherent and non-coherent integration time is calculated from a nominal value of the minimum guaranteed CN0 of GNSS signals on reception.
(6) The minimum delay between the punctual channel and the early and late channels, deriving the integrity control protection radius, is deduced from the targeted correlation contrast, the threshold on the calculated minimum signal-to-noise ratio and the chip width of the signal's PRN code according to the approach described in the appendix, based on formula (f.36)
(7) The objective Pfa for integrity control is calculated from the targeted correlation contrast according to the analytical formulation (f.24) given in the appendix.
(8) If the objective Pfa is lower than the expected Pfa, the delay between early-punctual-late paths defines the integrity control protection radius.
(9) If the protection radius of the integrity check is greater than the limit alarm threshold tolerated for the positioning service, the integrity check of the positioning system is declared unfeasible for the expected Pnd and Pfa objectives.
(10) If objective Pfa is higher than expected Pfa,
  (a) the coherent integration time at the output of matched filtering is gradually increased to a time equal to the TTA, so as to optimize the output signal-to-noise ratio after matched filtering $$SNR_k \cdot \sqrt{\frac{T_{NC}}{T_c}}$$

(b) The objective Pfa and Pnd are recalculated with the new output signal-to-noise ratio, without modifying the integrity control protection radius, according to the analytical formulations provided in the appendix.

(c) If the recalculated objective Pfa remains higher than the expected Pfa, the positioning system integrity check is declared unfeasible for the expected Pnd and Pfa targets.

Example of Performance and Settings

Here we describe an example of the application of protection radius calculation with different integration time settings:

Assuming a risk of non-integrity equal to the probability of non-detection; $Pnd = 10^{-5}$ Then we deduce, $$Erf_c(2 \cdot 10^{-5}) = 3,01 = \frac{\sqrt{SNR_k\left(1 - \frac{\Gamma_{Ck}(\tau_0)}{\Gamma_{Ck}(0)}\right)}}{2}$$

Hence, $$\sqrt{SNR_k\left(1 - \frac{\Gamma_{Ck}(\tau_0)}{\Gamma_{Ck}(0)}\right)} = 6,02$$

$$SNR_k\left(1 - \frac{\Gamma_{Ck}(\tau_0)}{\Gamma_{Ck}(0)}\right) = 36,24$$

Assuming a signal-to-noise ratio in the 50 Hz band of 26 dB $(= 10 \log (SNR))$ $$SNR = 400$$

$$\left(1 - \frac{\Gamma_{Ck}(\tau_0)}{\Gamma_{Ck}(0)}\right) = 0,0906$$

This gives a protection radius of 27 m for a C/A code spread of 300.

Increasing the non-coherent integration time to 3 seconds, corresponding to the rate at which GSC provides position information in static mode, results in a gain of 5 log $(T/T_{Ncc}) = 5 \log(3/0.02) \# 11$ dB In other words, an SNR after coherent integration of $26 + 11 = 37$ dB, Or, SNR = 5011 at natural value Which means, $$\left(1 - \frac{\Gamma_{Ck}(\tau_0)}{\Gamma_{Ck}(0)}\right) = 7,2 \times 10^{-3}$$

For a GPS C/A protection radius of 2.2 m

The invention claimed is:

1. A method for checking an integrity of a localization obtained by determining a position of a mobile or fixed carrier by proximity to a set of predefined reference positions, for implementation on the mobile or fixed carrier, said method making it possible to check that a correlation function of received GNSS signals is consistent with a selected reference position said method comprising:

(a) a step E1 for synchronizing a time base of the mobile or fixed carrier with a GNSS time calculated and transmitted by a GNSS positioning system;

(b) a step E2 for calculating a code phase of GNSS signals predicted at reception for all said reference positions and for all satellites visible at said reference positions;

(c) a step E3 for calculating a signal-to-noise ratio in an observation band after matched filtering of the received GNSS signals with said predicted GNSS signals;

(d) a step E4 for jointly determining a minimum protection radius ($PR_0$) and a processing integration time adapted to required risks of non-integrity and non-continuity, said minimum protection radius being determined as a function of a minimum delay ($\tau_0$) between a punctual correlation channel and early and late correlation channels, characteristic of a fault detection test applied to individual satellite signals, and a geometric dilution coefficient dependent on a spatial distribution of the received signals, defined according to the expression:

$$PR_0 = \tau_0 \times \min_{(i,j)\in Ns \times Ns}\left[\left(\frac{1}{\cos(El_i)} \times \frac{1}{\cos(El_j)}\right) \times \frac{1}{si/1(Az_i - Az_j)}\right] \text{ where,}$$

$\tau_0$ is the minimum spacing between the early, late and punctual correlation channels of a fault exclusion test applied to the individual satellite signals, to ensure the risks of non-integrity and non-continuity required for the integrity check and for the processing integration time;

Ns represents the set of selected satellites;

(i,j) is an index pair i and j among these satellites;

$Az_i$ is the azimuth angle (relative to north) of the satellite signal i;

$El_i$ is the elevation angle (relative to the horizontal plane) of the satellite signal i;

(e) a step E5, applied to each of said received GNSS signals and each of said reference positions, of calculating an effective level of the punctual correlation channel, obtained after adapted filtering of the signal by a local code expected for the predicted code phase, compensated for residual common biases of receiver group delay and GNSS time synchronization, after coherent and non-coherent integration;

(f) a step E6, applied to each of said GNSS signals received and each of said reference positions, for calculating an effective level of the so-called early correlation and late correlation channels, obtained after adapted filtering of the signal by expected local codes shifted by a said fraction of code chip in advance and in delay with respect to said predicted code phase of a point channel, after coherent and non-coherent integration, said code chip fraction being determined so as to comply with a constraint of probability of non-detection of a code phase bias of the signal within a protection radius set by integrity loss risk objectives associated with a control process;

(g) a step E7 for pre-selecting satellite signals suitable for taking part in a position integrity control test, based on a minimum signal-to-noise ratio criterion for the "point" channel, as calculated in step (E3), to ensure that the test is effective according to non-detection probability and false alarm probability objectives set for the integrity control;

(h) a position integrity check step E8 to protect against an occurrence of faults in the signals selected for a position error protection radius $PR_k$ equal to or possibly a multiple of the minimum protection radius $PR_0$, by excluding satellites whose code phases are not compatible with the predicted code phases for said reference positions tested, or which exhibit unexpected delay biases relative to the predicted code phases due to signal propagation or synchronization disturbances, the satellite exclusion method, being Maximum At Center (MAC), being characterized by the absence of a maximum at the center of a triplet $(T_k)$ of 3 correlation channels, early-punctual-late, centered on the predicted code phase for the reference position and spaced by a delay deviation $[(t)]_k$) multiple of the value $(\tau_0)$ of the minimum delay time offset of the early and late channels of a detection barrier;

(i) a step E9 for calculating, for each of said reference positions, an effective power level obtained, called likelihood, by cumulating elementary powers of the various selected satellites, after coherent and non-coherent integration; and (j) a step E10 for determining the reference position closest to the actual reception position by identifying the reference position with the highest plausibility, within a protection radius compatible with the false alarm and non-detection probability constraints set for the position integrity control method.

2. The method of checking the integrity of positioning information according to claim 1, comprising a step (E11) of self-determination of non-availability of monitoring with respect to the reference position tested, if no satellite is selected at the end of steps (E7) and (E8), the reference position tested then being removed from the set of possible candidate positions.

3. The method for checking the integrity of positioning information according to claim 1, comprising a step (E12) for calculating a reference noise level, being the noise-only reference, used for calculating the signal-to-noise ratio after matched filtering (step E3), wherein said noise-only reference is estimated, by retaining the minimum level of all matched-filtering outputs of the signals for a code phase delay exceeding a correlation support of a code chip, by estimating the variance of this output.

4. The method of checking the integrity of the positioning information according to claim 1, comprising a step (E13) of estimating the residual common biases of receiver group delay and GNSS time synchronization, after coherent and non-coherent integration, said estimation being characterized in that it allows:

(a) during a start-up or static phase of the mobile or fixed carrier, perform an initial estimation of a maximum likelihood in position of the mobile or fixed carrier with respect to a grid of possible positions;

(b) estimate residual satellite code delay bias only for the position of first maximum likelihood, corresponding to the most efficient position for observing geometric delay residuals;

(c) for this estimation of residual code delay bias, apply a multi-path deconvolution method with several correlation points;

(d) calculate a variance of a distribution of said residual biases at the current time (t) over all the satellites received for the position of said first maximum likelihood;

(e) calculate an average residual bias corresponding to the residual common bias, estimated for the position of the first maximum likelihood, and apply this correction for this common bias for the prediction of all code phases;

(f) apply the correction for this common bias to recalculate the code phases of the expected signals;

(g) perform a second maximum likelihood estimation in position of the mobile or fixed carrier on the grid of possible positions using the corrected code phases;

(h) calculate the mean and variance of the distribution of said corrected residual biases, always for the same current time (t);

(i) test the decrease in the variance value to validate the second maximum likelihood estimation in position and a new common bias value; and (j) move on to the next localization epoch and repeat the process, calculating the common bias.

5. The method for jointly determining the minimum protection radius and the processing integration time, according to step E4 of claim 1, both adapted to the risk of non-integrity and non-continuity of the control process, wherein:

(a) a non-detection probability (Pnd) expected from satellite monitoring is derived from the risk of loss of integrity set at the equipment level;

(b) the satellite targeted correlation contrast, defined by the product $$ SNR_k \cdot \sqrt{\frac{T_{NC}}{T_c}} \left( 1 - \frac{\Gamma_{Ck}(\tau_0)}{\Gamma_{Ck}(0)} \right) $$

is analytically deduced from the expected Pnd value;

(c) a false alarm probability (Pfa) expected from satellite monitoring is derived from the risk of loss of continuity set at equipment level;

(d) the processing integration time for the coherent and non-coherent integration is determined from an alarm delay called TTA set at equipment level;

(e) a minimum signal-to-noise ratio threshold corresponding to the coherent and non-coherent integration time is calculated from a nominal value of a minimum guaranteed CN0 of GNSS signals on reception;

(f) the minimum delay between the punctual channel and the early and late channels, defining the integrity control protection radius, is deduced from the targeted correlation contrast, the threshold on the calculated minimum signal-to-noise ratio and the chip width of the signal's PRN code;

(g) the objective Pfa of integrity control is analytically deduced from the targeted correlation contrast;

(h) if the objective Pfa is lower than the expected Pfa, the delay between early-punctual-late channels defines the integrity control protection radius;

(i) the minimum positional protection radius is calculated on the assumption that at least 3 satellites are visible simultaneously, and that all are selected by the MAC's detection barrier;

(j) if the minimum protection radius is greater than the limit alarm radius tolerated for the positioning service, the positioning system integrity check is declared unfeasible for the expected Pnd and Pfa objectives;

(k) if the minimum protection radius is smaller by a ratio k than the limit alarm radius tolerated for the positioning service, the positioning system integrity check is declared feasible for the expected Pnd and Pfa targets, and the value of the $(\tau_0)$ of the delay time offset of the early and late channels of the MAC detection barrier can be relaxed by a coefficient k in accordance with step 8 of claim 1;

(l) if objective Pfa is higher than expected Pfa, i) the coherent integration time at the matched filter output is gradually increased to a time equal to the TTA, so as to optimize the output signal-to-noise ratio after matched filtering $SNR_{k-1}$ $$\left.\sqrt{\frac{T_{NC}}{T_c}}\,\right|;$$

ii) the objective Pfa and Pnd are recalculated with the new output signal-to-noise ratio, without modifying the integrity control protection radius, according to the analytical formulations defined by the invention; and iii) if the recalculated objective Pfa remains higher than the expected Pfa, the positioning system integrity check is declared unfeasible for the expected Pnd and Pfa targets.

6. A device for checking the integrity of the positioning information according to claim 1, wherein said device is configured to implement the integrity checking method according to claim 1.

7. A non-transitory computer program product comprising computer-readable instructions which, when executed on a processor, cause the processor to execute a method according to claim 1.

\* \* \* \* \*